(12) United States Patent
Tanaka

(10) Patent No.: US 8,421,748 B2
(45) Date of Patent: Apr. 16, 2013

(54) INFORMATION EXCHANGE DEVICE

(75) Inventor: Masahide Tanaka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 214 days.

(21) Appl. No.: 12/809,258

(22) PCT Filed: Dec. 19, 2008

(86) PCT No.: PCT/JP2008/073239
§ 371 (c)(1),
(2), (4) Date: Jun. 18, 2010

(87) PCT Pub. No.: WO2009/081879
PCT Pub. Date: Jul. 2, 2009

(65) Prior Publication Data
US 2011/0175879 A1    Jul. 21, 2011

(30) Foreign Application Priority Data

Dec. 21, 2007   (JP) ................. 2007-330994
Dec. 25, 2007   (JP) ................. 2007-332981
Dec. 28, 2007   (JP) ................. 2007-339841
Jan. 30, 2008   (JP) ................. 2008-018720

(51) Int. Cl.
*G09G 5/00*   (2006.01)
(52) U.S. Cl.
USPC ....................... 345/156; 455/41.1
(58) Field of Classification Search .......... 345/156; 455/41.1; 340/870.37, 870.38
See application file for complete search history.

(56) References Cited

U.S. PATENT DOCUMENTS

| 7,082,316 B2* | 7/2006 | Eiden et al. ............. 455/519 |
| 2002/0046220 A1* | 4/2002 | Freeman et al. ......... 707/501.1 |
| 2002/0126137 A1* | 9/2002 | Kaestner, Jr. ............ 345/619 |
| 2006/0256700 A1 | 11/2006 | Ishibashi et al. |
| 2006/0293905 A1* | 12/2006 | Ramanathan et al. ..... 705/1 |

FOREIGN PATENT DOCUMENTS

| JP | 3-117065 | 5/1991 |
| JP | 7-064923 | 3/1995 |
| JP | 2001-177480 | 6/2001 |
| JP | 2002-246987 | 8/2002 |
| JP | 2006-081025 | 3/2006 |
| JP | 2006-270345 | 10/2006 |
| JP | 2006-271798 | 10/2006 |
| JP | 2006-279365 | 10/2006 |
| JP | 2007-172040 | 7/2007 |
| JP | 2007-272310 | 10/2007 |
| WO | 03/021875 | 3/2003 |
| WO | 2007/116804 A1 | 10/2007 |

* cited by examiner

*Primary Examiner* — Stephen Sherman
(74) *Attorney, Agent, or Firm* — Fish & Richardson P.C.

(57) ABSTRACT

An information exchange device includes a human body communication unit which applies information flowing via a human body to a human body and detects information flowing via the human body, an information transmission unit which transmits information via the human body communication unit, an identification unit which identifies other device which can transmit information from the information transmission unit, a detection unit which detects a contact state with other human body, and a transmission control unit which starts transmission of information according to identification by the identification unit and a detection by the detection unit.

9 Claims, 14 Drawing Sheets

INFORMATION EXCHANGE DEVICE

TECHNICAL FIELD

The present invention relates to an information exchange device.

BACKGROUND ART

Various types of methods such as wireless communication have been proposed for exchanging information. As one of the methods, there is proposed human body communication by an electrostatic field or an induction field induced around a human body (Patent Document 1). In addition, there is introduced a method of using human body communication for data transmission and reception between external terminals such as mobile phones and portable game machines, in which, for example, data transmission and reception is performed from an external terminal of a person to another external terminal of another person via human bodies when they shake hands (Patent Document 2). On the other hand, an electronic business card device which can exchange business cards by an electromagnetic wave without using paper is also proposed (Patent Document 3).

Patent Document 1: JP-A-2006-271798
Patent Document 2: JP-A-2006-81025
Patent Document 3: JP-A-2007-272310

DISCLOSURE OF THE INVENTION

Problem to be Solved by the Invention

However, for such information exchange, it is necessary that an opponent also supports the same information exchange means, and there are many issues to be considered for wide use thereof.

An object of the present invention is, in view of the above-mentioned background, to provide an information exchange device that is capable of smooth information exchange with an opponent.

Means for Solving the Problem

In order to achieve the above-mentioned object, an information exchange device according to the present invention includes a human body communication unit which applies information flowing via a human body to a human body and detects information flowing via the human body, an information transmission unit which transmits information via the human body communication unit, an identification unit which identifies other device which can transmit information from the information transmission unit, a detection unit which detects a contact state with other human body, and a transmission control unit which starts transmission of information according to identification by the identification unit and a detection by the detection unit (first configuration).

Further, in the information exchange device having the first configuration, it is preferable that the identification unit includes a sensing unit which senses that the other device can support a function of the human body communication unit (second configuration).

In addition, in the information exchange device having the second configuration, it is preferable that the sensing unit includes a wireless communication function unit and performs the sensing based on a radio wave received by the wireless communication function unit (third configuration).

In addition, in the information exchange device having the second configuration, it is preferable that the sensing imit performs the sensing based on information transmitted from the human body communication unit (fourth configuration).

In addition, it is preferable that the information exchange device having the second configuration includes an operation unit which determines the enabled or disabled state of communication by the human body communication unit, and the sensing unit can perform the sensing regardless of the enabled or disabled state of communication by the human body communication unit (fifth configuration).

In addition, in the information exchange device having the first configuration, it is preferable that the identification unit includes an enrollment unit which enrolls other device for information transmission by the information transmission unit, and a sensing unit which senses other device, and identifies a device that is capable of information exchange by the transmission unit if the other device sensed by the sensing unit matches the enrollment of the enrollment unit (sixth configuration).

In addition, in the information exchange device having the sixth configuration, it is preferable that the transmission control unit does not start information transmission to the other device when a contact state with other human body is detected next time even if the other device is enrolled in the enrollment unit, if the sensing unit does not sense for a predetermined time (seventh configuration).

In addition, it is preferable that the information exchange device having the sixth configuration includes an operation unit which sets the enabled or disabled state of communication by the human body communication unit, in which the transmission control unit starts information transmission automatically based on detection by the detection unit regardless of setting by the operation unit, if the other device sensed by the sensing unit matches the enrollment of the enrollment unit (eighth configuration).

In addition, in the information exchange device having the sixth configuration, it is preferable that the information transmission unit includes a modulation unit which modulates the information into a narrow-band transmission signal, an adjustment unit which adjusts a band of the transmission signal modulated by the modulation unit in relationship with opponent enrolled in the enrollment unit, and a storage unit which stores a band of the transmission signal adjusted by the adjustment unit (ninth configuration).

In addition, it is preferable that the information exchange device having the first configuration is structured as a mobile phone (tenth configuration).

In addition, in the information exchange device having the first configuration, it is preferable that the information transmitted by the information transmission unit is e-mail information, and the human body communication unit detects information flowing via human bodies with hands tied (eleventh configuration).

In addition, in the information exchange device having the first configuration, it is preferable that the information transmitted by the information transmission unit is contents information, and the human body communication unit detects information flowing via human bodies with hands tied (twelfth configuration).

In addition, in the information exchange device having the first configuration, it is preferable that the information transmitted by the information transmission unit is business card information, and the human body communication unit detects information flowing via human bodies with hands tied (thirteenth configuration).

In addition, it is preferable that the information exchange device having the thirteenth configuration includes an information reception unit which receives business card information via the human body communication unit, a storage unit for the business card information, and a comparing unit which compares the business card information received by the information reception unit with the business card information stored in the storage unit (fourteenth configuration).

In addition, the information exchange device according to the present invention includes a communication unit, an information reception unit which receives business card information via the communication unit, a storage unit for the business card information, and a comparing unit which compares the business card information received by the information reception unit with the business card information stored in the storage unit (fifteenth configuration).

Further, it is preferable that the information exchange device having the fifteenth configuration includes a storage control unit which controls the storage unit, if it is found by the comparing unit that the business card information stored in the storage unit includes information of the same person whose business card information was already received by the information reception unit and that contents thereof is changed, to store the information after the change in addition to the information before the change, so as to accumulate history information of the same person (sixteenth configuration).

In addition, it is preferable that the information exchange device having the fifteenth configuration includes a control unit which controls the storage unit to store reception date and time of the business card information received by the information reception unit so as to accumulate a log of meeting with the same person (seventeenth configuration).

In addition, it is preferable that the information exchange device having the fifteenth configuration includes a storage unit which stores reception order of business card information of a plurality of persons automatically based on the information reception unit (eighteenth configuration).

In addition, it is preferable that the information exchange device having the fifteenth configuration includes a display unit that can layout the received business card information of a plurality of persons, a function operation unit for making the display unit perform a display concerning a function other than the business card information display, an automatic off control unit which automatically turns display off on the display unit if the function operation unit is not operated for a predetermined time, and a display control unit which disables the function of the automatic off control unit if the display unit starts a layout display of the business card information, so that the layout display of the business card information is continued even if an operation of the function operation unit is not performed for the predetermined time (nineteenth configuration).

In addition, the information exchange device according to the present invention includes a display unit which can display received business card information, a function operation unit for making the display unit perform a display concerning a function other than the business card information display, an automatic off control unit which automatically turns display off on the display unit if the function operation unit is not operated for a predetermined time, and a display control unit which disables the function of the automatic off control unit if the display unit starts a layout display of the business card information, so that the layout display of the business card information is continued even if an operation of the function operation unit is not performed for the predetermined time (twentieth configuration).

Note that the present invention can adopt various configurations other than the above description, which will be described in detail below.

Effects of the Invention

According to the present invention, it is possible to provide an information exchange device that is capable of smooth information exchange with an opponent.

EXPLANATION OF NUMERALS

1, 101 information exchange device (mobile phone)
6, 106 control unit (mobile control unit)
12, 112 storage unit (content holding unit, enrollment unit)
14, 114 display unit
20, 120 mobile short range communication unit
28, 128 modulation/demodulation unit
32, 132 transmission/reception electrode
202 information reproduction device (headphone block)

BEST MODE FOR CARRYING OUT THE INVENTION

Figure 1:
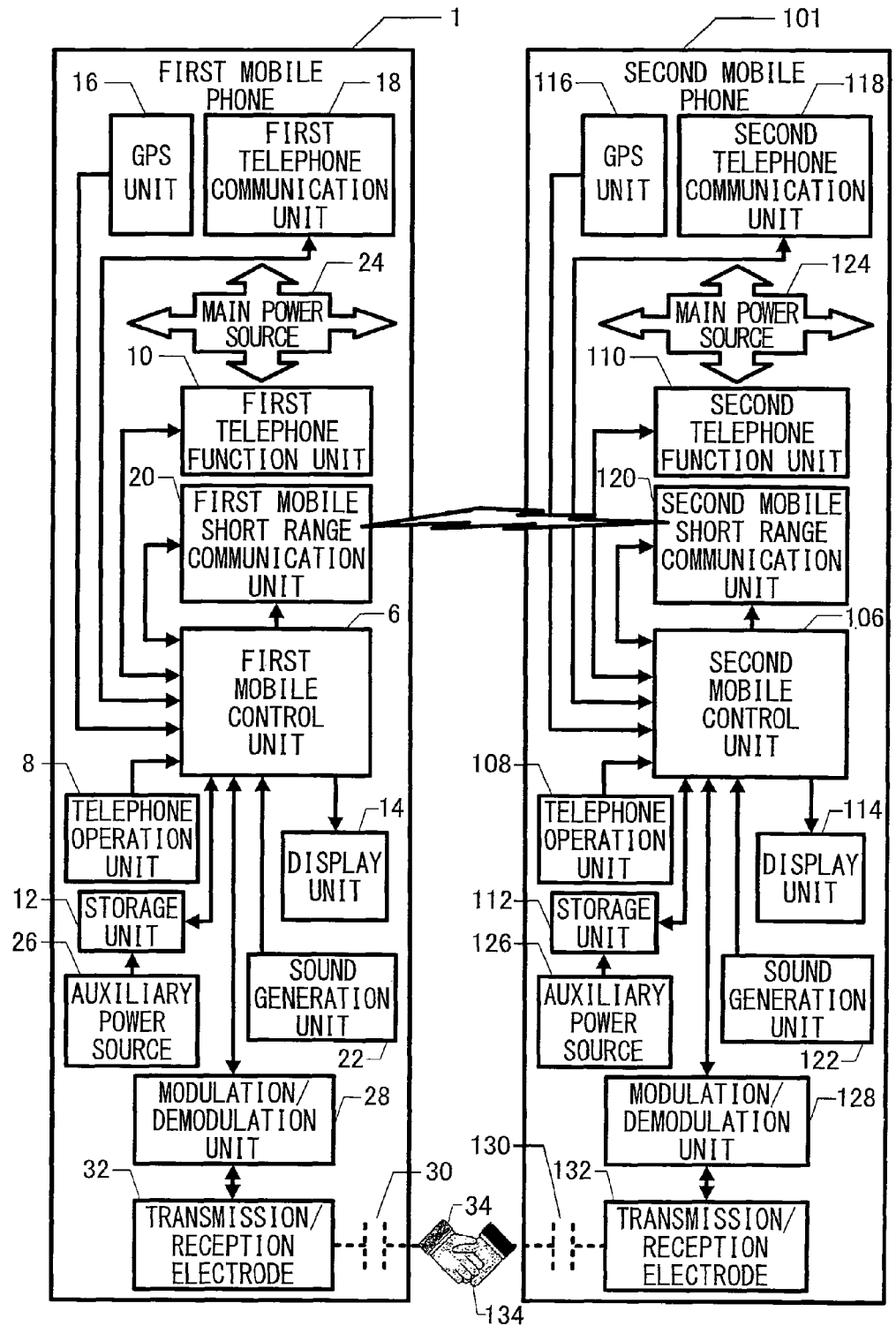
FIG. 1 is a block diagram illustrating Example 1 of an information exchange system according to an embodiment of the present invention.

FIG. 1 is a block diagram illustrating Example 1 of an information exchange system according to an embodiment of the present invention. The present example constitutes a system including a pair of mobile phone consisting of a first mobile phone 1 and a second mobile phone 101. A structure inside the second mobile phone 101 is basically the same as that of the first mobile phone 1, and corresponding elements are denoted by numerals having the same two lower digits, so that detailed description of the second mobile phone 101 will be omitted, unless otherwise requires.

The first mobile phone 1 includes a first mobile control unit 6 constituted of a computer controlling the entire first mobile phone 1 and controls a first telephone function unit 10 and the like in accordance with an operation of a telephone operation unit 8. The first telephone function unit 10 is a part related to a normal telephone function and includes a sound processing unit, a transmitter and a receiver.

Functions of the first mobile control unit 6 is performed by software stored in a storage unit 12. The storage unit 12 also stores temporarily various data necessary for controlling the entire first mobile phone 1 and is also a storage device for information such as address book data to be accumulated and stored in the first mobile phone 1. The first mobile control unit 6 further controls a display unit 14 to display a GUI display in association with the operation of the telephone operation unit 8 and displays control results. The first mobile control unit 6 also controls a sound generation unit 22. This sound generation unit 22, which is disposed separately from the receiver as a sound output unit, generates notification sounds and warning sounds related to various functions of the first mobile phone 1 in association with the display unit 14 and also works as a speaker in a video telephone mode and the like.

A GPS unit 16 obtain information of latitude, longitude and altitude as absolute position information of the first mobile phone 1 from satellites or a nearest broadcasting station based on the GPS system and sends the information to the first mobile control unit 6. This absolute position information is displayed on the display unit 14 together with a map with control by the first mobile control unit 6 so as to provide navigation information.

The first mobile phone 1 can perform wireless communication with the first telephone function unit 10 and a first telephone communication unit 18 via a telephone line including usual telephone call. The first mobile phone 1 also includes a first mobile short range communication unit 20 utilizing a wireless LAN, the Bluetooth (a registered trademark), a weak radio wave or the like, so as to be capable of wireless communication with other mobile phone or the like existing in a short range communication range.

This first mobile short range communication unit 20 is based on a specification without legal restriction and with free charge unlike a telephone line or the like though its communication range is restricted.

The first mobile short range communication unit 20 communicates business card information that will be described later, transmits the absolute position information obtained by the above-mentioned GPS unit 16 to a GPS unit of other device and can receive the absolute position information obtained by the other device with its GPS unit. Thus, the display unit 14 can display not only its own position but also a position of the other device on the same map, so that a relative relationship between them can be checked on the map. A detail thereof is described in Japanese patent application No. 2007-28393 filed by the same applicant, and the like.

In addition, the first mobile phone 1 includes a camera unit that is not illustrated in the drawings, so that taken images can be stored in the storage unit 12. In addition, the image can be transmitted to other mobile phone by the first telephone communication unit 18. Note that the first mobile phone 1 is supplied with power from a rechargeable main power source 24, and the storage unit 12 is further backed up by an auxiliary power source 26 constituted of a lithium battery or the like. Thus, information stored in the storage unit 12 is prevented from volatilizing when the main power source 24 is discharged or replaced.

The first mobile phone 1 further includes a modulation/demodulation unit 28 and a transmission/reception electrode 32 in association with the same. These elements constitute a human body communication system disclosed in JP-A-2006-271798 and the like, for example. When the business card information or the like of the owner of the first mobile phone 1 stored in the storage unit 12 is output from the first mobile control unit 6, the information is modulated into transmission signal by the modulation/demodulation unit 28, and the transmission signal is applied to a human body 34 holding the first mobile phone 1 from the transmission/reception electrode 32 via capacitance coupling 30. In FIG. 1, only the right hand part tied with other person's hand is typically illustrated as the human body 34, but actually the capacitance coupling 30 exists between the transmission/reception electrode 32 and the left hand (not shown) because the first mobile phone 1 is held by the left hand (not shown) of the human body 34.

When the transmission signal is applied to the human body 34 as described above, an electrostatic field or an induction field having intensity corresponding to the transmission signal is induced around the human body 34. Therefore, when the right hand of the human body 34 is tied up with the right hand of a human body 134 as illustrated in FIG. 1, the electrostatic field or the induction field around the human body 34 is transmitted to the human body 134. In this case, if the left hand (not shown) of the human body 134 holds the second mobile phone 101, the transmission signal is detected via capacitance coupling 130 between the left hand and a transmission/reception electrode 132 and is demodulated by a modulation/demodulation unit 128. Thus, a second mobile control unit 106 receives the transmitted business card information and stores the same in a storage unit 112.

As described above, when the human body 34 and the human body 134 are tied (shake hands) with each other, the business card information or the like stored in the storage unit 12 is transmitted to the storage unit 112. In the same manner, the business card information or the like stored in the storage unit 112 is transmitted to the storage unit 12. Thus, electronic exchange of business card information by shake hand can be established. In this way, electronic exchange of business card information can be performed by human body communication. The exchanged business card information can be checked at any time mutually by displaying on the display unit 14 or a display unit 114 and can also be processed as electronic data as appropriate.

The first mobile phone 1 and the second mobile phone 101 in FIG. 1 can communicate with each other by infrastructure communication via base stations of a communication line between the first telephone communication unit 18 and a second telephone communication unit 118.

On the other hand, the first mobile phone 1 and the second mobile phone 101 can perform direct ad hoc communication by the first mobile short range communication unit 20 and a second mobile short range communication unit 120.

Figure 2:
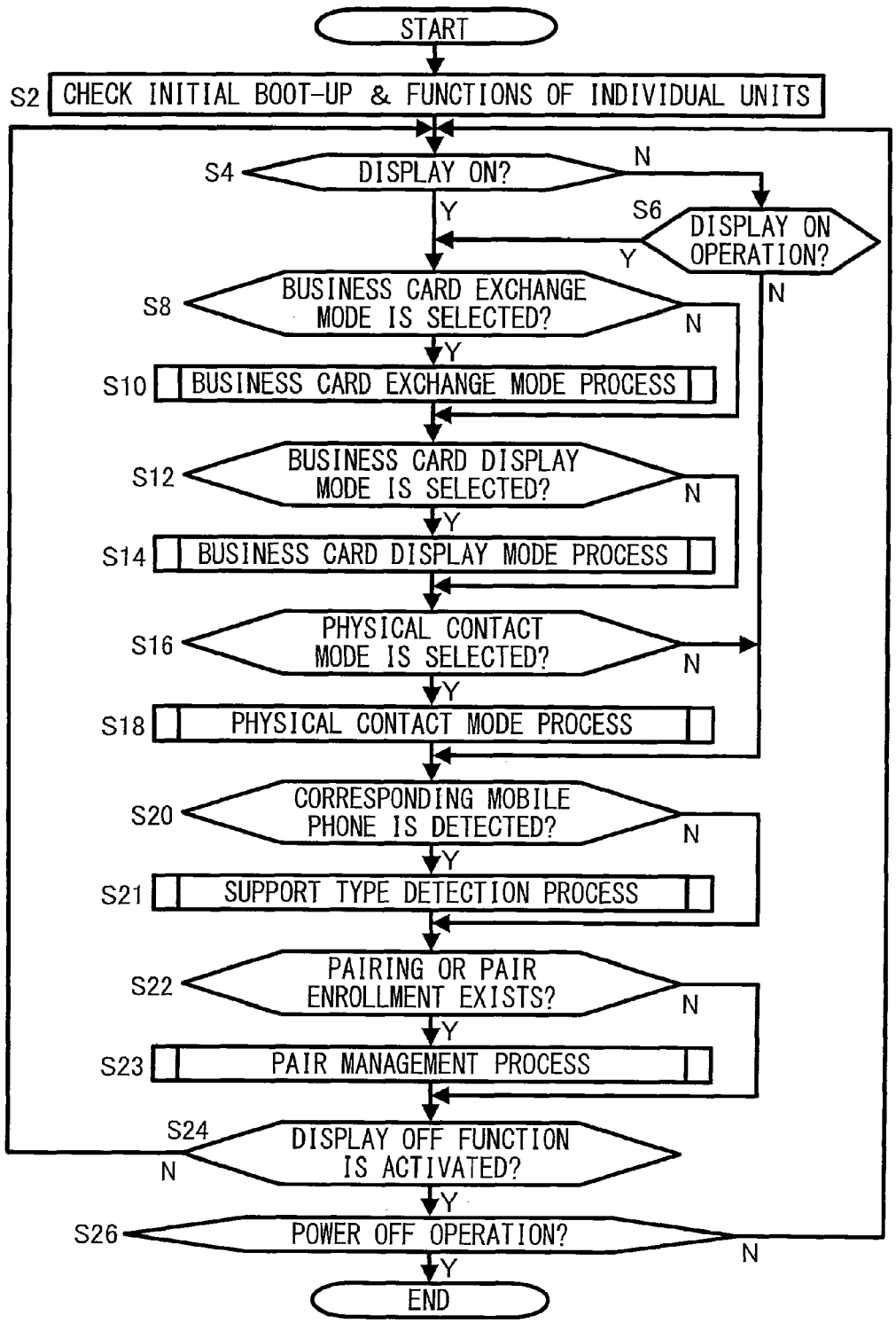
FIG. 2 is a basic flowchart of a function of a mobile control unit of Example 1 illustrated in FIG. 1.

FIG. 2 is a basic flowchart of a function of the first mobile control unit 6 of Example 1 illustrated in FIG. 1, which starts by a power on operation of the first mobile phone 1. When the process flow starts, initial boot-up of a mobile phone function and check of individual functions are performed first in Step S2.

Next in Step S4, it is checked whether or not the display is turned on. If the display is turned on, the process flow goes to Step S8. On the contrary, if the display is not turned on, it is checked in Step S6 whether or not there is an operation of turning on the display. If the operation of turning on the display is detected, the process flow goes to Step S8. Usually, when the mobile phone is powered on, the display is turned on, so that the process flow goes directly from Step S4 to Step S8. Note that the checking in Step S4 is performed as appropriate as long as the mobile phone is turned on, as described later. Further, for example, if the mobile phone is a foldable type and is folded so that the display is turned off as a standby state, or if an automatic power off function works when no operation has been detected for a predetermined time so that the display is turned off, the process flow goes from Step S4 to Step S6. In this case, if it is detected that the display is turned on when the folded mobile phone is unfolded or a certain operation is performed, the process flow goes from Step S6 to Step S8.

In Step S8, it is checked whether or not a business card exchange mode is selected from an operation menu. If the mode is selected, the process flow goes to Step S10 so as to start a business card exchange mode process. When this process is finished, the process flow goes to Step S12. Details of the business card exchange mode process in Step S10 will be described later. On the contrary, if the selection of the business card exchange mode is not detected in Step S8, the process flow directly goes to Step S12.

In Step S12, it is checked whether or not a business card display mode is selected from the operation menu. If the mode is selected, the process flow goes to Step S14 so as to start a business card exchange mode process. When this process is finished, the process flow goes to Step S16. Details of the business card display mode process in Step S14 will be described later. On the contrary, if the selection of the business card display mode is not detected in Step S12, the process flow directly goes to Step S16.

In Step S16, it is checked whether or not a physical contact mode is selected from the operation menu. If the mode is selected, the process flow goes to Step S18 so as to start a physical contact mode process. When this process is finished, the process flow goes to Step S20. The physical contact mode process in Step S18 is a mode in which e-mail information can be exchanged or music reproduction information can be shared by human body communication in a physical contact state where hands are tied or bodies are pressed to each other. On the contrary, if the selection of the physical contact mode is not detected in Step S16, the process flow directly goes to Step S20.

In Step S20, it is checked whether or not other mobile phone supporting the human body communication can be detected by the communication with the first mobile short range communication unit 20. If it is detected, the process flow goes to Step S21 so as to start a support type detection process. When this process is finished, the process flow goes to Step S22. Details of the support type detection process in Step S21 will be described later. On the contrary, if the mobile phone is not detected in Step S20, the process flow directly goes to Step S22.

In Step S22, it is checked whether or not there is a pairing for information exchange or a pair enrollment of paired devices. If there is a pairing or a pair enrollment, the process flow goes to Step S23 so as to perform a pair enrollment management process, and then the process flow goes to Step S24. The pair management process in Step S23 is a step for managing the pairing or the pair enrollment in view of security when it is made by the physical contact mode process in Step S18 or the support type detection process in Step S21, and a detail thereof will be described later. Note that if there is no pairing or pair enrollment in Step S22, the process flow directly goes to Step S24.

In Step S24, it is checked whether or not the function of turning off the display is activated. If the function is not activated, the process flow goes back to Step S4 so as to repeat the process from Step S4 to Step S24 as long as the display is turned on. On the contrary, if activation of the function of turning off the display is sensed in Step S24, the process flow goes to Step S26. This corresponds, for example, to the case where the display is turned off manually by folding the mobile phone or is automatically turned off when the automatic power off function works after no operation has been detected for a predetermined time, as described above.

In Step S26, it is checked whether or not the power off operation has been performed. If the power off operation is not detected, the process flow goes back to Step S4 so as to repeat the process from Step S4 to Step S26 as long as the power is turned on. On the contrary, if the power off operation is sensed in Step S26, the process flow is finished promptly.

Note that if the operation of turning on the display is not detected in Step S6, the process flow directly goes to Step S20. In this way, the business card exchange mode and the physical contact mode cannot be selected unless the display is turned on, so as to prevent information in the first mobile phone 1 from leaking or being skimmed by a contact from an unknown person or an accidental contact with an object.

Further, the functions of the business card exchange mode and the physical contact mode cannot be activated unless they are selected intentionally. Thus, the double security countermeasures are taken including the above-mentioned requirement for turning on the display, so that accidental information leakage does not occur by the human body communication.

Figure 3:
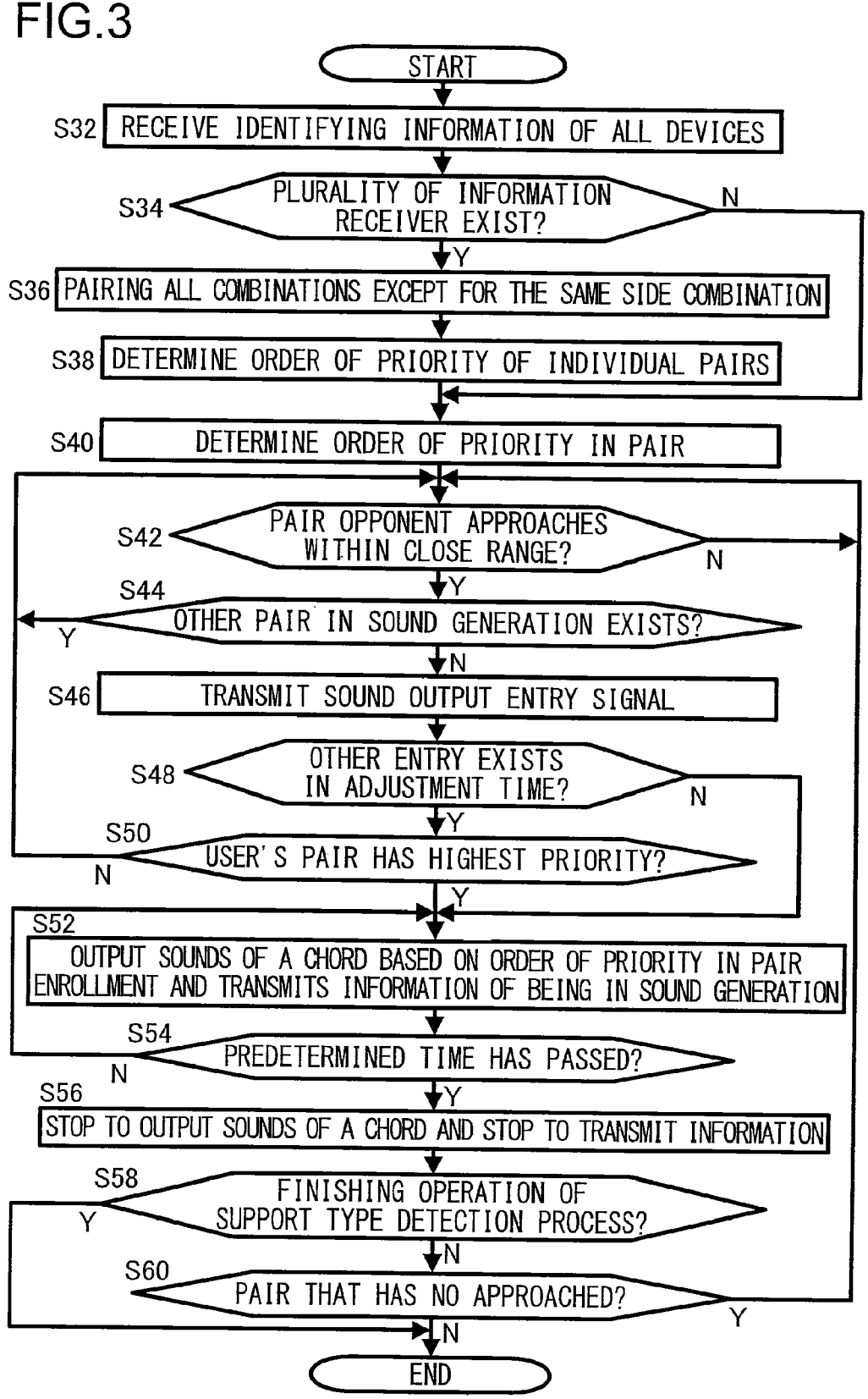
FIG. 3 is a flowchart illustrating details of Step S21 in FIG. 2.

FIG. 3 is a flowchart illustrating details of the support type detection process in Step S21 of FIG. 2. If it is detected in Step S20 of FIG. 2 that the mobile phone exists near, the support type detection process in FIG. 3 starts. This corresponds, for example, to the case where a person guides a guest to a drawing room, and the first mobile short range communication unit 20 of the person can detect by communication that the second mobile phone 101 of the guest supports the human body communication. Note that the process flow in FIG. 3 is constituted so as to support the case of a plurality of guests, too.

When the process flow starts, first in Step S32, information for identifying all the detected mobile phones that support the human body communication is received. As the identifying information, it is possible to use, for example, a serial number or a telephone number assigned to each mobile phone. Note that it is possible to detect whether or not each mobile phone supports the human body communication, by exchanging codes indicating the support type.

Next, it is checked in Step S34 whether or not a plurality of mobile phones that support the human body communication are detected. Then, if a plurality of mobile phones are detected, the process flow goes to Step S36, in which pairing of all possible combinations of members of the guest company and the host company is performed. In this case, combinations of members of the same side, e.g., the host company are excluded because they have no meaning.

As a specific example, it is supposed that Company A (members A1 and A2) has a meeting with Company B (members B1, B2 and B3). All the combinations determined in the pairing in Step S36 are Pair 1 (A1 and B1), Pair 2 (A1 and B2), Pair 3 (A1 and B3), Pair 4 (A2 and B1), Pair 5 (A2 and B2) and Pair 6 (A2 and B3).

Further, in Step S38, the order of priority of individual pairs is determined. For instance, in the above-mentioned case, the order of priority is determined as the order of Pair 1, Pair 2, Pair 3, Pair 4, Pair 5 and Pair 6. Next, in Step S40, the order of priority in each pair is determined. For instance, in Pair 1, the order of priority is determined as A1 and B1. These orders of priority are automatically determined by using serial numbers, for example. In other words, the order of priority in the pair is determined as the order of serial numbers, while between pairs, a smaller serial number in the pair is compared with that in the other pair so that the order of priority is determined. These orders of priority are tactical and are used for a purpose of organizing functions of the plurality of mobile phones as described later.

Further, in Step S34, if only one mobile phone that supports the human body communication is detected, the process in Step S36 and Step S38 is omitted so that Step S40 is directly performed.

After the above-mentioned pairing is performed and the order of priority is determined, the process flow goes to Step S42 so as to check whether or not a person of any pair has approached to the user's mobile phone within the close range. This corresponds to the case where the user faces anybody for exchanging business cards, where the opponent is one. Specifically, only the closest person is detected based on a difference of the distance between the person who can face for exchanging business cards and the other person. Further, it is detected that the person approaches within a predetermined distance. This function is achieved by detecting intensity of the radio wave from the opponent with the first mobile short range communication unit 20. In this way, the process in Step S42 is repeated until a mobile phone that approaches within the close range is detected while waiting the detection.

If it is detected in Step S42 that an opponent of the pair including the user approaches within the close range of the user's mobile phone, the process flow goes to Step S44 so as to check whether or not the other pair is performing sound generation by communication of the first mobile short range communication unit 20. This sound generation means that when it is detected that the pair of mobile phones entering the close range support the human body communication, both the mobile phones generate a predetermined frequency of sound signal. Details of it will be described later.

If it is checked in Step S44 that the other pair is not performing the sound generation, there is no risk that the sound becomes an interference sound superposing the sound of the other pair or makes the sound of the user's pair be hard to hear when the mobile phones of the user's pair generate sound indicating that the human body communication is supported. Therefore, the process flow goes to Step S46. The reason why the check of Step S44 is performed before the process of Step S46 is to avoid the situation where the exchange of business cards may be performed by a plurality of pairs simultaneously. If the sound generation is performed here and there simultaneously without any adjustment between the pairs, the sounds cannot be recognized by each, and this situation should be avoided.

In Step S46, an entry signal for the sound generation is output in a preliminary manner from the first mobile short range communication unit 20 to mobile phones in the environment. Next, it is checked in Step S48 whether or not the entry signal is received from another pair in a predetermined adjustment time (e.g., 0.1 seconds). This is for a purpose of avoiding the situation where a plurality of pairs perform the sound generation simultaneously. If a plurality of mobile phones output the entry signal in the predetermined adjustment time, the order of the sound generation of the individual mobile phones is adjustment, so as to avoid the situation where a plurality of pairs perform the sound generation simultaneously.

If it is detected in Step S48 that there is an entry from another pair, the process flow goes to Step S50 in which it is checked whether or not the user's pair has the highest priority in the plurality of entries. If it is the highest priority, the process flow goes to Step S52. On the contrary, if no entry from another pair is detected in the adjustment time in Step S48, the process flow goes promptly to Step S52. In Step S52, the sound generation or the like is performed, and details thereof will be described later.

Note that if there is another pair performing the sound generation in Step S44, the sound generation is not performed, and the process flow goes back to Step S42. In addition, if it is found that the order of the user's pair is not the highest priority in Step S50, the next sound generation is assigned to another pair, and the process flow goes back to Step S42. In this way, the process from Step S42 to Step S50 is repeated until all the conditions are satisfied, which are that a pair opponent approaches within the close range, that the other pair is not performing the sound generation, and that there is no entry of another pair or the users pair has the highest priority even if there is any in the adjustment time.

Next, Step S52 will be described in detail. In Step S52, first, the approaching pair if enrolled so that information exchange can be performed between them by shaking hands. In addition, a sound of a chord is generated from the sound generation unit 22 based on the order of priority in the pair. For instance, it is supposed that a chord consisting of "C" and "E" is output as the sound generation. If the user's order of priority in the pair is higher, "C" is output as the sound generation. On the other hand, the opponent in the pair outputs "E" as the sound generation at the same time. Therefore, a harmony of "C" and "E" is heard. In this way, when both the mobile phones in the pair perform the sound generation simultaneously, it can be recognized clearly that the both of them are performing the sound generation. If only one of them performs the sound generation, only a single sound is heard.

Note that in Step S52 different chords are assigned to different pairs. For instance, another pair is assigned with a chord of "B" and "D". In addition, the function from Step S44 to Step S50 disables other pairs to perform the sound generation when the user's pair is performing the sound generation, so that mixture of another sound into the harmony of the user's pair can be prevented.

In Step S52, information indicating that the user's pair is performing the sound generation is transmitted to other mobile phones in the environment, so that the function of Step S44 works in the other mobile phones.

When the sound generation and the information transmission are started in Step S52, the process flow goes to Step S54 while continuing the sound generation and the information transmission. Then, it is checked whether or not a predetermined time (e.g., 5 seconds) has passed from the start of the sound generation. If it has not passed, the process flow goes back to Step S52 so as to continue the sound generation and the information transmission. If the predetermined time has passed, the process flow goes to Step S56 so as to stop the output of the sound of chord and to stop the transmission of information indicating that the sound generation is being performed.

Next, the process flow goes to Step S58 in which it is checked whether or not the operation of stopping the support type detection process is performed. If the operation is not performed, the process flow goes to Step S60 so as to check whether or not there is any pair having an opponent that has not approached yet. If there is no pair having an opponent that has not approached, the process flow is finished. Further, if the operation of finishing the support type detection process is detected in Step S58, the process flow is finished regardless of whether or not there is any pair having an opponent that has not approached. On the contrary, if it is detected in Step S60 that there is a pair having an opponent that has not approached, the process flow goes back to Step S42 so as to wait approach thereof.

Since Step S58 is provided, in the case where there is no intention to continue the detection of the support type detection any longer or the case where a prompt selection of the business card exchange mode is wanted, the support type detection process can be finished promptly. Further, if the structure as described later is adopted so that the selection of the business card exchange mode can be detected not only in Step S8 but also in the interrupt of exchanging business cards, the selection of the business card exchange mode can be selected promptly without the operation in Step S58.

In the process flow of FIG. 3, the process from Step S32 to Step S40 is performed in all the mobile phones that receive the identifying information from each other, simultaneously in synchronization with other mobile phones if necessary. On the contrary, the process from Step S42 to Step S60 is performed between mobile phones of the pair approaching within the close range, simultaneously in synchronization with other mobile phones if necessary.

Figure 4:
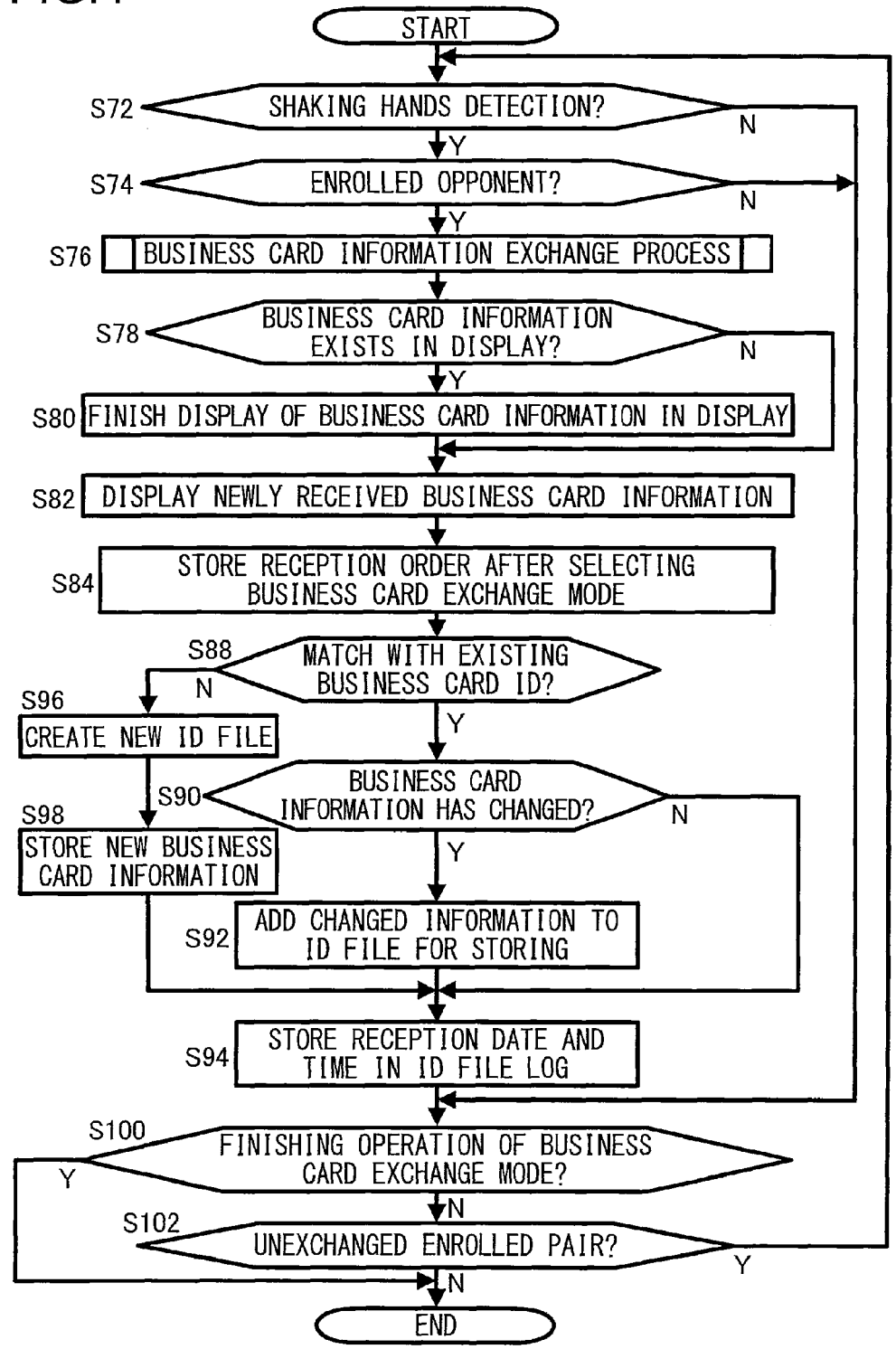
FIG. 4 is a flowchart illustrating details of Step S10 in FIG. 2.

FIG. 4 is a flowchart illustrating details of the business card exchange mode process in Step S10 of FIG. 2. If it is detected in Step S8 of FIG. 2 that the business card exchange mode is selected manually, the business card exchange mode process in FIG. 4 starts. In addition, the process flow in FIG. 4 is started at any time also by interrupt based on manual operation detection of the business card exchange mode setting.

Here, the situation where the business card exchange mode is selected will be described. The business card exchange is first performed with paper business cards. When the persons approach each other for the business card exchange, the chord is heard based on the function of Step S52 in FIG. 3. Thus, it is checked that the mobile phones of them support the human body communication and are enrolled by each other for information exchange. Then, the persons use their mobile phones so as to set them to the business card exchange mode manually as preparation for the electronic business card exchange by shaking hands. Alternatively, if mobile phones having the human body communication function become commonplace, the setting to the business card exchange mode is performed before the meeting with the opponent without waiting the function in Step S42 and the following steps in FIG. 3.

In any case, the business card information is exchanged only in the case where both the setting to the business card exchange mode and the enrollment of each other are completed, and the security is kept so that the business card information does not leak accidentally.

When the process in FIG. 4 starts, it is checked first in Step S72 whether or not shaking hands is performed. If the shaking hands is detected, the process flow goes to Step S74 so as to check whether or not the opponent of the shaking hands is a person enrolled in Step S52 of FIG. 3. Then, if the opponent is the enrolled person, the process flow goes to the business card information exchange process in Step S76. A detail thereof will be described later.

When the business card information exchange process in Step S76 is finished, the process flow goes to Step S78 in which it is checked whether or not there is business card information that is displayed at present. For instance, when the user shakes hands with a second or later opponent, business card information obtained by shaking hands with the previous opponent is displayed on the display unit 14. In this case, therefore, there is business card information that is displayed at present.

If it is checked in Step S78 that there is business card information that is displayed at present, the process flow goes to Step S80 in which the display is finished, and the process flow goes to Step S82. On the contrary, if it is not detected in Step S78 that there is business card information that is displayed at present, it means that the user has just shaken hands with a first opponent. Therefore, the process flow goes directly to Step S82.

In Step S82, new business card information received in Step S76 is displayed. Thus, by viewing the display unit of the own mobile phone, the user can check a title, a name and the like of the opponent as character information in the same manner as the case where a paper business card is received. Next, the process flow goes to Step S84 while continuing the display of the business card information, and the business card information reception order after selecting the business card exchange mode is stored in the own mobile phone. This is for a reference when the business card layout is organized as described later.

Next, it is checked whether or not the information received in Step S88 matches an ID of an existing business card stored in the mobile phone. As the ID, a serial number or a telephone number of the mobile phone received in Step S32 can be used as it is.

If it is detected in Step S88 that the reception information ID matches the existing business card ID, the process flow goes to Step S90. Then, a content of the business card information is compared with the existing information, so as to check whether or not there is a change in the business card information. Usually, if the business card is received from the same person, it is considered that there is a change in information of company, title or the like.

If it is checked in Step S90 that there is a change in the business card information, the process flow goes to Step S92 so as to add the changed information to an ID file of the person, and the process flow goes to Step S94. Thus, maintaining the information before changing, a history of the person is added and recorded. On the contrary, if a change of the business card information is not detected in Step S90, the process flow directly goes to Step S94.

In addition, if the matching with existing business card ID is not detected in Step S88, it means to be a first meeting with the person. Therefore, the process flow goes to Step S96 so as to create a new ID file. Next, the new business card information is stored in the ID file in Step S98, and the process flow goes to Step S94.

In Step S94, reception date and time of the business card information is stored in the ID file log, and the process flow goes to Step S100. Since the reception date and time is stored in Step S94, the meeting date and time with the same opponent is stored in the ID file log not only in the case where new business card information or change information of an existing business card is received but also in the case where there is no change in the business card information. In this way, the information exchange by shaking hands is useful not only for obtaining business card information but also for accumulating a log of meeting with the same opponent.

Note that if there is no detection of shaking hands in Step S72, the process flow directly goes to Step S100. In addition, if the opponent of shaking hands detected in Step S74 is not an enrolled opponent, the process flow directly goes to Step S100. Thus, if the hand shake is detected but the opponent is not an enrolled opponent, the following business card information exchange process is not performed. In other words, the business card information is not exchanged unless the opponent is a specific opponent, so that the security can be kept.

In Step S100, it is checked whether or not there is a business card exchange mode finishing operation. If there is not the operation, the process flow goes to Step S102 in which it is checked whether or not there is an enrolled pair with which business card information is not exchanged yet. If there is no enrolled pair with which business card information is not exchanged, it means that business card information exchange is finished for all the opponents at the site. Therefore, the process flow is automatically finished. On the contrary, if there is an enrolled pair with which business card information is not exchanged, the process flow goes to Step S72, so that the process from Step S72 to Step S102 is repeated until there is no enrolled pair with which business card information is not exchanged. However, if the manual operation of finishing the business card exchange mode is detected in Step S100, the process flow is finished promptly regardless of presence or absence of the enrolled pair with which business card information is not exchanged.

Figure 5:
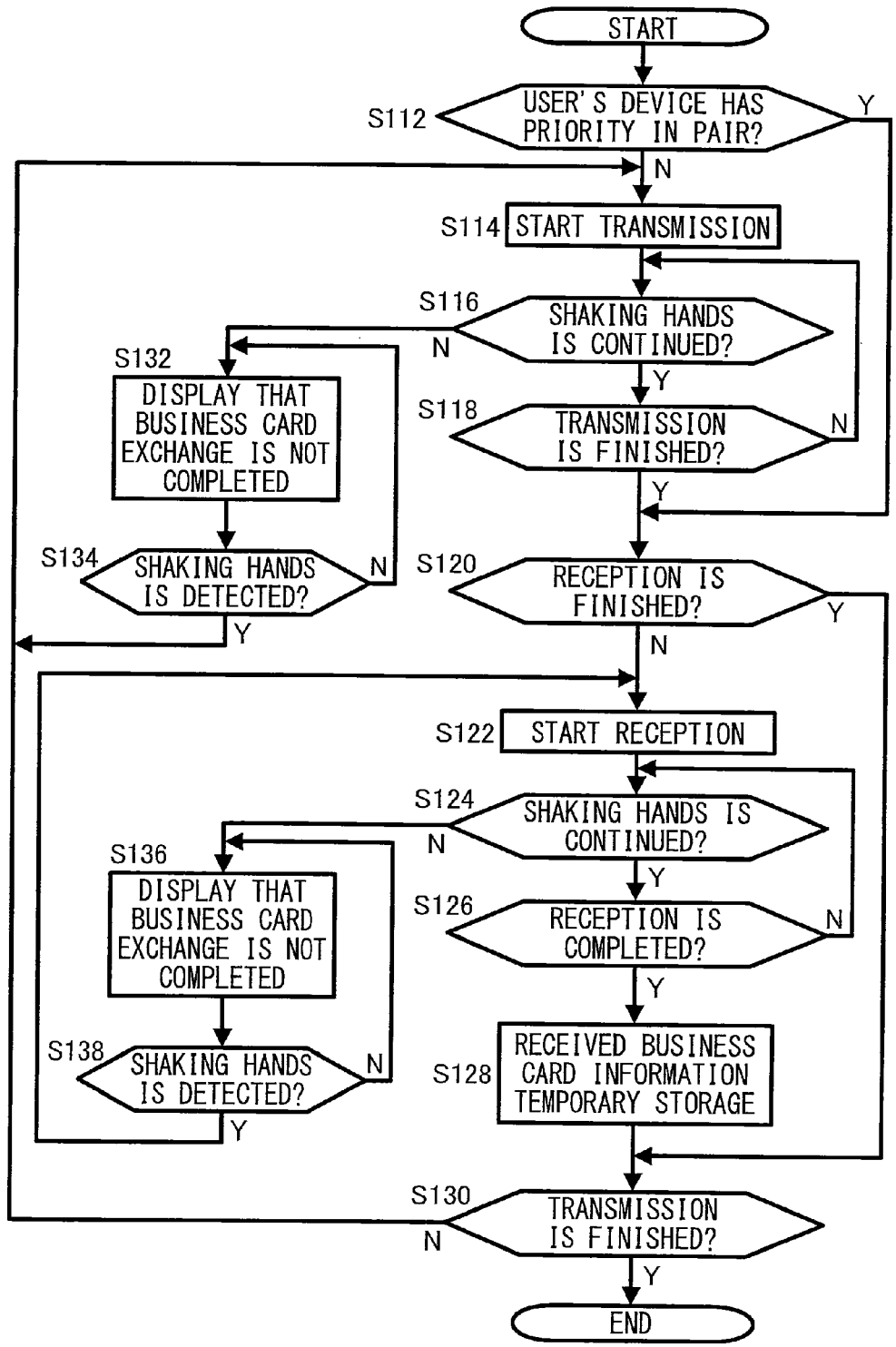
FIG. 5 is a flowchart illustrating details of Step S76 in FIG. 4.

FIG. 5 is a flowchart illustrating details of the business card information exchange process in Step S76 of FIG. 4. When the process flow starts, it is checked in Step S112 whether or not the order of the user's mobile phone has a priority in the pair of shaking hands. If it does not have a priority, the process flow goes to Step S114 so as to start the business card information transmission. In this case, the opponent has a priority on the contrary and starts reception of the business card information.

Next in Step S116, it is checked whether or not the shaking hands is continued. If it is continued, it is checked in Step S118 whether or not the transmission is completed. If it is not completed, the process flow goes back to Step S116, so as to repeat the process of Step S116 and Step S118 as long as the shaking hands is continued while waiting the completion of the transmission.

When it is confirmed in Step S118 that the transmission is completed, the process flow goes to Step S120 in which it is checked whether or not the reception is finished. In the case where the process flow goes from Step S118 to Step S120, the reception is not finished usually. Therefore, the process flow goes to Step S122 so as to start the reception.

Next in Step S124, it is checked whether or not the shaking hands is continued. If it is continued, it is checked in Step S126 whether or not the transmission is completed. If it is not completed, the process flow goes to Step S124, so as to repeat the process of Step S124 and Step S126 as long as the shaking hands is continued while waiting the completion of the transmission.

When the completion of the reception is confirmed in Step S126, the process flow goes to Step S128 so as to store the received business card information temporarily. This is performed for supporting a later display and for storing in the storage unit 12 if necessary. This temporary storage is maintained at least until the display in the business card display mode process that is started just after the business card information exchange becomes unnecessary.

When the temporary storage is completed, the process flow goes to Step S130 so as to check whether or not the transmission is finished. In the case where the process flow goes from Step S128 to Step S130, the transmission is usually finished. Therefore, the process flow is finished.

In contrast, if the order of the user's mobile phone has a priority in the pair of shaking hands in Step S112, the process flow goes to Step S120. When the process flow goes from Step S112 to Step S120, the reception is finished. Therefore, the process flow goes to S122 in which the reception is started.

Next in Step S124, it is checked whether or not the shaking hands is continued. If it is continued, it is checked in Step S126 whether or not the transmission is completed. If it is not completed, the process flow goes back to Step S124, so as to repeat the process of Step S124 and Step S126 as long as the shaking hands is continued, while waiting the reception.

If the completion of the reception is confirmed in Step S126, the process flow goes to Step S128, so as to store the received business card information temporarily. When the temporary storage is completed, the process flow goes to Step S130, so as to check whether or not the transmission is finished. If the process flow goes from Step S112 to Step S120 and reaches Step S130 as a result, the transmission is usually not finished. Therefore, the process flow goes to Step S114 so as to start the business card information transmission.

Next in Step S116, it is checked whether or not the shaking hands is continued. If it is continued, it is checked in Step S118 whether or not the transmission is completed. If it is not completed, the process flow goes to Step S116, so as to repeat the process of Step S116 and Step S118 as long as the shaking hands is continued while waiting the completion of the transmission.

If it is confirmed in Step S118 that the transmission is completed, the process flow goes to Step S120 so as to check whether or not the reception is finished. In this case, the reception is usually finished. Therefore, the process flow goes to Step S130 so as to check whether or not the transmission is fished In this case too, the transmission is usually finished. Therefore, the process flow is finished.

The process from Step S132 to Step S138 is related to an action when the shaking hands is stopped in the middle of the business card information transmission or in the middle of the reception.

First, if it is detected in Step S116 that the shaking hands is not continued any longer, the process flow goes to Step S132 in which the display unit 14 displays a warning display indicating that the business card exchange is not completed. In this case, the sound generation unit 22 may also output warning sound or announce of the same meaning.

Then, the process flow goes to Step S134, so as to check whether or not the shaking hands is restarted responding to the warning in Step S132. The process of the Step S132 and Step S134 is repeated until the shaking hands is detected, so as to wait the restart of the shaking hands. If the shaking hands is detected in Step S134, the process flow goes back to Step S114 so as to start retransmission.

On the contrary, if it is detected in Step S124 that the shaking hands is not continued any longer, the process flow goes to Step S136, so as to perform a warning display indicating that the business card exchange is not completed on the display unit 14 (and by the sound generation unit 22 if necessary).

Then, the process flow goes to Step S138 so as to check whether or not the shaking hands is restarted responding to the warning in Step S136. Then, the process of Step S136 and Step S138 is repeated until the shaking hands is detected while waiting restart of the shaking hands. If the shaking hands is detected in Step S138, the process flow goes back to Step S122 so as to start to receive again.

Figure 6:
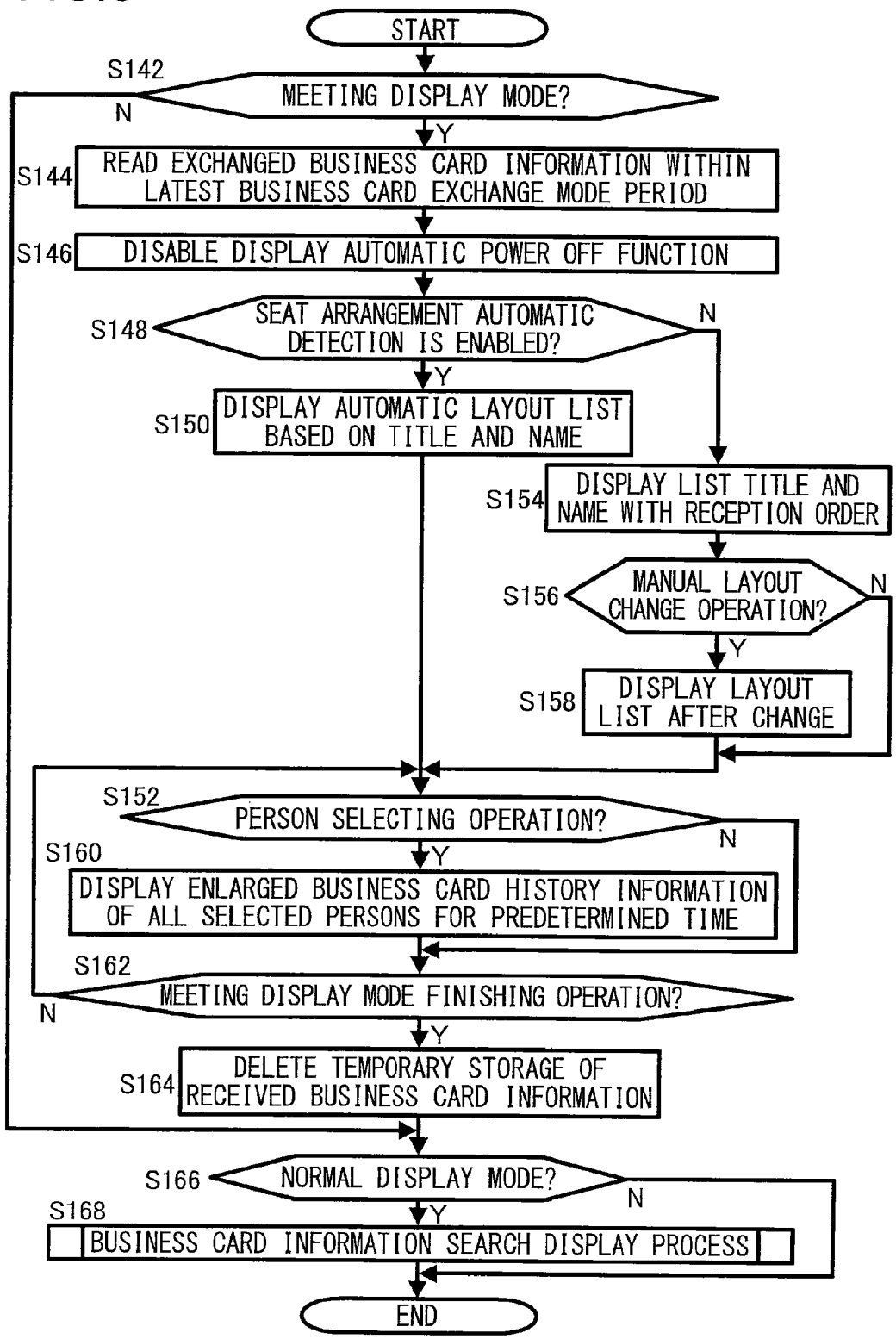
FIG. 6 is a flowchart illustrating details of Step S14 in FIG. 2.

FIG. 6 is a flowchart illustrating details of the business card display mode process in Step S14 of FIG. 2. When it is detected in Step S12 of FIG. 2 that the business card display mode is selected manually, the business card display mode process of FIG. 6 is started. In addition, it is also possible to start the business card display mode of FIG. 6 at any time by interrupt based on detection of manual operation of selecting the business card display mode.

When the process flow starts, it is checked first in Step S142 whether or not a meeting display mode is set as a selection in a menu. The meeting display mode is a mode of displaying on the display unit 14 a layout corresponding to seat positions of opponents of received titles and names so as to simulate the arrangement of exchanged paper business cards corresponding to seat positions of the opponents on the desk.

When the setting of the meeting display mode is detected in Step S142, the process flow goes to Step S144 so as to read from the storage unit 12 business card information exchanged in the latest business card exchange mode period. Specifically, operation time of the latest business card exchange mode selecting operation in Step S8 of FIG. 2 and the latest business card exchange mode finishing operation of FIG. 4 are detected, and all the business card information received in the period is read out. This corresponds to business card information of all the members of the opponent sitting at seats after finishing the business card exchange at the opening of the meeting.

In the case of paper business cards, in many cases, business cards are not exchanged between persons who are known to each other. Therefore, the business card of the person cannot be display on the desk. In contrast, in the present example, if the shaking hands is performed, business card information is automatically exchanged even the person is known one, and the information is temporarily stored in the mobile phone. Therefore, business card information of all members of the opponent can be displayed on the display unit 14 every time of meeting, which can be auxiliary memory of the user.

Next, the process flow goes to Step S146 so as to disable the display automatic power off function. In the display of an ordinary mobile phone, there is a function of automatically turning off the display if there is no operation for a predetermined time in a display other than the display of the meeting display mode. However, in the meeting display mode, it is considered that the user want to display a list of the business card information of the opponent on the display unit 14 for long time without any operation of the mobile phone. Therefore, in Step S146, the automatic power off function is disabled so as to prevent the automatic power off function from acting like a usual mobile phone function resulting in turning off the list display of the business card information automatically during the meeting.

Next in Step S148, it is checked whether or not the seat positions of the opponent members can be automatically sensed based on the information of the first mobile short range communication unit 20. This is performed by exchanging radio wave intensity information among the plurality of mobile phones using the triangulation technique.

If it is checked in Step S148 that the seat positions can automatically be detected, the process flow goes to Step S150. Then, titles and names of the opponent members are detected from the received business card information, so that automatic layout is performed corresponding to the seat arrangement of the detected titles and names, and they are displayed in a list on the display unit 14. Then, the process flow goes to Step S152.

On the contrary, if it is decided in Step S148 that the seat arrangement cannot be detected automatically, the process flow goes to Step S154 so as to extract titles and names of the opponent members with reception order information from the received business card information and to display them in a list on the display unit 14. This reception order information is stored via Step S84 in FIG. 4.

Then, the process flow goes to Step S156 so as to check whether or not there is a manual operation of changing the seating layout based on reception order information and features of faces based on memory. This corresponds to placing paper business cards in order when receiving them. When the manual layout change operation is detected in Step S156, the process flow goes to Step S158, titles and names of the opponent members are displayed in a list on the display unit 14 in accordance with the layout after the change. Then, the process flow goes to Step S152. On the contrary, if the manual operation is not detected in Step S156, the process flow directly goes to Step S152.

In Step S152, it is checked whether or not there is an operation of selecting a specific person from the list display on the display unit 14. If there is the operation, the process flow goes to Step S160 in which all business card history information of the selected person is displayed in an enlarged manner on the display unit 14 for a predetermined time (e.g., 10 seconds). Then, as the predetermined time passes, the enlarged display is automatically finished so as to go back to the list display, and the process flow goes to Step S162. Note that the process flow may go from Step S160 to Step S162 not only when the predetermined time passes but also when a manual operation is performed.

On the contrary, if the operation of selecting a person is not detected in Step S152, the process flow directly goes to Step S162.

In Step S162, it is detected whether or not there is an operation of finishing the meeting display mode. If it is not detected, the process flow goes back to Step S152. After that, the process of Step S152, Step S160 and Step S162 is repeated until the meeting display mode finishing operation is detected, so that the list display of the business card information is maintained, and it is possible to confirm detailed history of a specific person among them at any time.

On the contrary, if the meeting display mode finishing operation is detected in Step S162, the process flow goes to Step S164 so as to delete the received business card information stored temporarily in Step S128 of FIG. 5, and the process flow goes to Step S166.

In addition, if the meeting display mode setting is not detected in Step S142, the process flow goes directly to Step S166.

In Step S166, it is usually checked whether or not the display mode is set. If the setting is detected, the process flow goes to Step S168 so as to enter a search display process of the business card information. In this Step S168, based on a database of the business card information stored in the storage unit 12, it is possible to set search condition and to execute the search by the telephone operation unit 8 under control of the first mobile control unit 6 and a GUI of the display unit 14. In addition, a result of the search is displayed on the display unit 14.

When the business card information search display process is finished in accordance with a finishing procedure in Step S168, the process flow of the business card display mode is finished. In addition, if the normal display mode setting is not detected in Step S166, the process flow is finished promptly.

Although Example 1 describes the mobile phone, embodiments of the present invention are not limited to this description. For instance, it is possible to incorporate the functions of the business card information exchange described above not in a mobile phone but in other mobile information terminals such as a personal digital assistant (PDA) or a mobile music player. In addition, it is possible to incorporate the functions of the business card information exchange described above in a wristwatch. Further, it is possible to incorporate the functions of the business card information exchange described above in a business card case for housing paper business cards.

Note that the functions of the business card information exchange described above can be incorporated not only in one device but also in a plurality of devices in a spirit manner. For instance, it is possible to incorporate the modulation/demodulation unit 28 and the transmission/reception electrode 32 illustrated in FIG. 1, a skeleton structure for controlling them, and a weak radio wave communication function unit in a wristwatch and to incorporate other function units in a mobile device or tool such as a personal computer or a bag which is not necessarily close to a human body and can communicate with the wristwatch via the weak radio wave communication function unit. Further, it is possible to install the function units which can communicate with the wristwatch via the weak radio wave communication not in the mobile device but in a meeting room fixedly as a facility.

In addition, the above-mentioned Example 1 describes the function of using the first mobile short range communication unit 20 illustrated in FIG. 3 as details of the support type detection process in Step S21 of FIG. 2, but embodiments of the present invention is not limited to this structure. For instance, it is possible to adopt a structure in which communication is tried by the human body communication when the shaking hands is performed, and it is decided that the opponent device supports the human body communication if a response such as a code indicating to be a support type is received. In this case, it is possible to perform both the detection whether or not the opponent device can respond and the subsequent exchange of business card information in one action of shaking hands.

In addition, instead of the above-mentioned structure, it is possible to adopt a structure in which it is checked in the first action of shaking hands only whether or not the opponent device can respond by the human body communication. In this case, after confirming that the opponent device can respond in the first action of shaking hands, the selection of the business card exchange mode in FIG. 2 is performed, and then the business card information exchange similar to FIG. 4 is performed as the second action of shaking hands.

Figure 7:
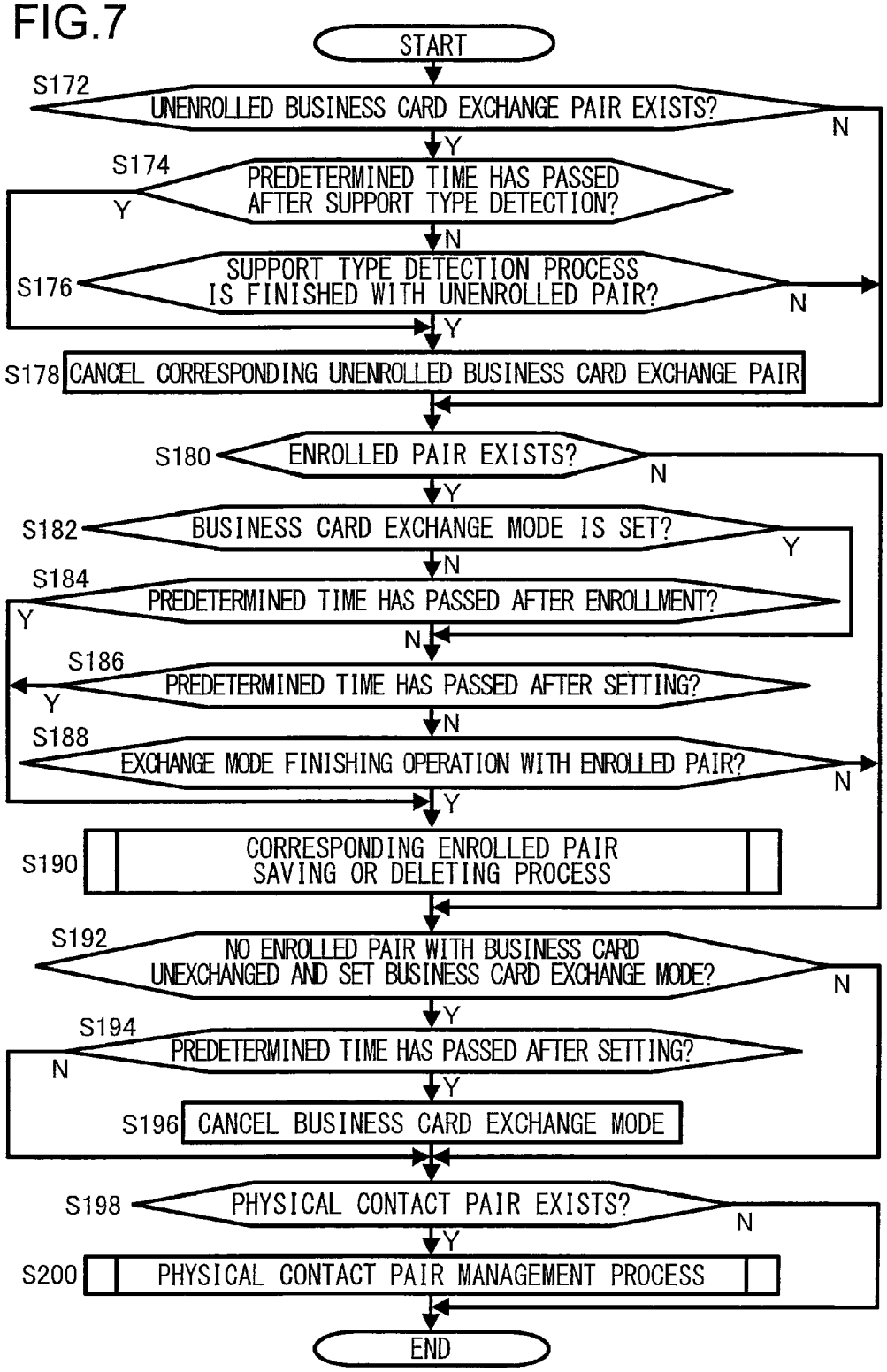
FIG. 7 is a flowchart illustrating details of Step S23 in FIG. 2.

FIG. 7 is a flowchart illustrating details of a pair enrollment management process in Step S23 of FIG. 2. If it is detected that there is the pairing or the pair enrollment in Step S22 of FIG. 2, the pair enrollment management process of FIG. 7 is started.

When the process flow starts, it is checked first in Step S172 whether or not there is an unenrolled business card exchange pair. If there is an unenrolled business card exchange pair, the process flow goes to Step S174. The case where there is an unenrolled business card exchange pair in Step S172 means the case where a pair is generated in the pairing process from Step S36 to Step S40 in FIG. 3, but it remains without the enrollment in Step S52, and the support type detection process is finished by the finishing operation detected in Step S58.

In Step S174, it is checked whether or not the unenrolled business card exchange pair detected in Step S172 is due to passing of a predetermined time (e.g., 15 minutes) after the detection in Step S20 of FIG. 2 that causes the pairing process from Step S36 to Step S40 in FIG. 3. Then, if it is due to passing of the predetermined time, the process flow goes to Step S178 so as to cancel the unenrolled business card exchange pair, and the process flow goes to Step S180.

This cancel of the business card exchange pair is performed for deciding that there is no intention of the business card exchange if the predetermined time passes after the supporting mobile phone is detected without no pair enrollment, so that confusion afterward or accidental leakage of information can be prevented.

On the contrary, if the predetermined time has not passed yet in the check of Step S174, the process flow goes to Step S176. In Step S176, it is checked whether or not the unenrolled business card exchange pair detected in Step S172 is a result remaining after the support type detection process is finished by the function in Step S58 of FIG. 3. If it is true, the process flow goes to Step S178 so as to cancel the unenrolled business card exchange pair, and the process flow goes to Step S180.

This is performed for the purpose as follows. Even if the predetermined time in Step S174 has not passed, if the support type detection process finishing operation is detected in Step S58 while remaining the unenrolled business card exchange pair, it is decided that there is no intention of performing the business card exchange any more. Then, the business card exchange pair is canceled for preventing confusion afterward or accidental leakage of information.

As described above, it is possible to prevent accidental business card exchange due to remaining unenrolled exchange pair. Further, if the unenrolled business card exchange pair is not detected in Step S172, the process from Step S174 to Step S178 is not necessary. Therefore, the process flow directly goes to Step S180.

In the above description, if the support type detection process finishing operation detected in Step S58 is performed is performed in the situation where the business card exchange with an unenrolled pair afterward is intended, there is no problem in going to the process from Step S176 to Step S178 in which the unenrolled business card exchange pair is once canceled. It is because the pairing is performed again when process flow in FIG. 2 is repeated to go to the process of Step S20 and Step S21 again, as long as there is the opponent who intends the business card exchange in the neighborhood.

In addition, as being clear from FIG. 2, the detection in Step S22 is performed after finishing the support type detection process in Step S21. Therefore, the function of Step S176 works usually, and the process flow goes to Step S178. The function of Step S174 works in the case where the process flow of FIG. 4 is started only by the interrupt based on the detection of the manual operation of setting the business card exchange mode, so that the support type detection process is forced to stop without going through Step S58 in FIG. 3, and the unenrolled business card exchange pair has remained. Note that Step S174 can support other situations of every accidental remaining of the unenrolled business card exchange pair.

In Step S180, it is checked whether or not there is an enrolled pair that has not performed the business card exchange. If there is such an enrolled pair, the process flow goes to Step S182 in which it is checked whether or not the business card exchange mode is set. If it is not set, the process flow goes to Step S184, in which it is checked whether or not a predetermined time (e.g., 10 seconds) has passed after enrollment of the corresponding pair. If the predetermined time has not passed yet, the process flow goes to Step S186. On the contrary, if the business card exchange mode is set in Step S182, the process flow directly goes to Step S186.

In Step S186, it is checked whether or not a predetermined time (e.g., 3 minutes) has passed after the business card exchange mode is set. If the predetermined time has not passed, the process flow goes to Step S188. Note that the check in Step S186 basically corresponds to the case where the process flow goes from Step S182 directly to Step S186. If the process flow goes to Step S186 via Step S184, the business card exchange mode is not set yet. Therefore, a result of the check in Step S186 is always that the predetermined time has not passed, so the process flow goes to Step S188.

In Step S188, it is checked whether or not the business card exchange mode finishing operation in Step S100 of FIG. 4 is performed in the state with an enrolled pair.

If it is detected in Step S188 that the operation of finishing the business card exchange mode was performed despite of a remaining enrolled pair, the process flow goes to Step S190 so as to perform a process of determining to save or delete the corresponding enrolled pair. A detail thereof will be described later.

On the contrary, if a predetermined time has passed in Step S184 or Step S186, it can be considered that there is no intention of the business card exchange anymore, so the process flow goes to Step S190.

When the saving or deleting process of the corresponding enrolled pair in Step S190 is finished, the process flow goes to Step S192. In addition, also in the case where the business card exchange mode finishing operation is not detected in Step S188, the process flow goes to Step S192. Note that if the enrolled pair is not detected in Step S180, the process flow directly goes to Step S192.

As described above, the process from Step S172 to Step S190 is performed for preventing accidental leak of business card information due to a remaining unenrolled business card exchange pair or enrolled pair that has not performed the business card exchange, so that the pair is handled appropriately.

On the contrary, the process from Step S192 to Step S196 is performed for preventing accidental leak of business card information when leaving the setting of the business card exchange mode that permits the business card information to go out by contact with others.

First, in Step S192, it is checked whether or not it is the state where there is no enrolled pair that has not performed the business card exchange despite of the business card exchange mode is set. If it is true, the process flow goes to Step S194 in which it is checked whether or not a predetermined time (e.g., 15 minutes) has passed after the business card exchange mode is set. If the predetermined time has passed, the process flow goes to Step S196 in which the business card exchange mode is automatically canceled, and the process flow goes to Step S198. This is performed for preventing accidental leak of business card information due to continuation of the business card exchange mode, considering that the business card exchange mode finishing operation is forgotten if an irrational state like Step S192 has continued for a predetermined time.

Further, if it is not detected that it is the state where there is no enrolled pair that has not performed the business card exchange despite of the business card exchange mode is set, or if it is not detected that the predetermined time has passed in Step S194, the process flow directly goes to Step S198.

In Step S198, it is checked there is a physical contact pair to be a target of the physical contact mode process in Step S18 of FIG. 2. If there is such a pair, the process flow goes to Step S200, in which a physical contact pair management process is started. This process is a management process for setting stricter security for exchanging e-mail information than security for sharing music reproduction information in the human body communication supposed between a physical contact pair, or for preventing a violation of privacy due to accidental contact with others when leaving the setting of the physical contact pair.

When the physical contact pair management process is finished, the pair management process in FIG. 7 is finished. In addition, if the physical contact pair is not detected in Step S198, the pair management process is finished promptly.

Figure 8:
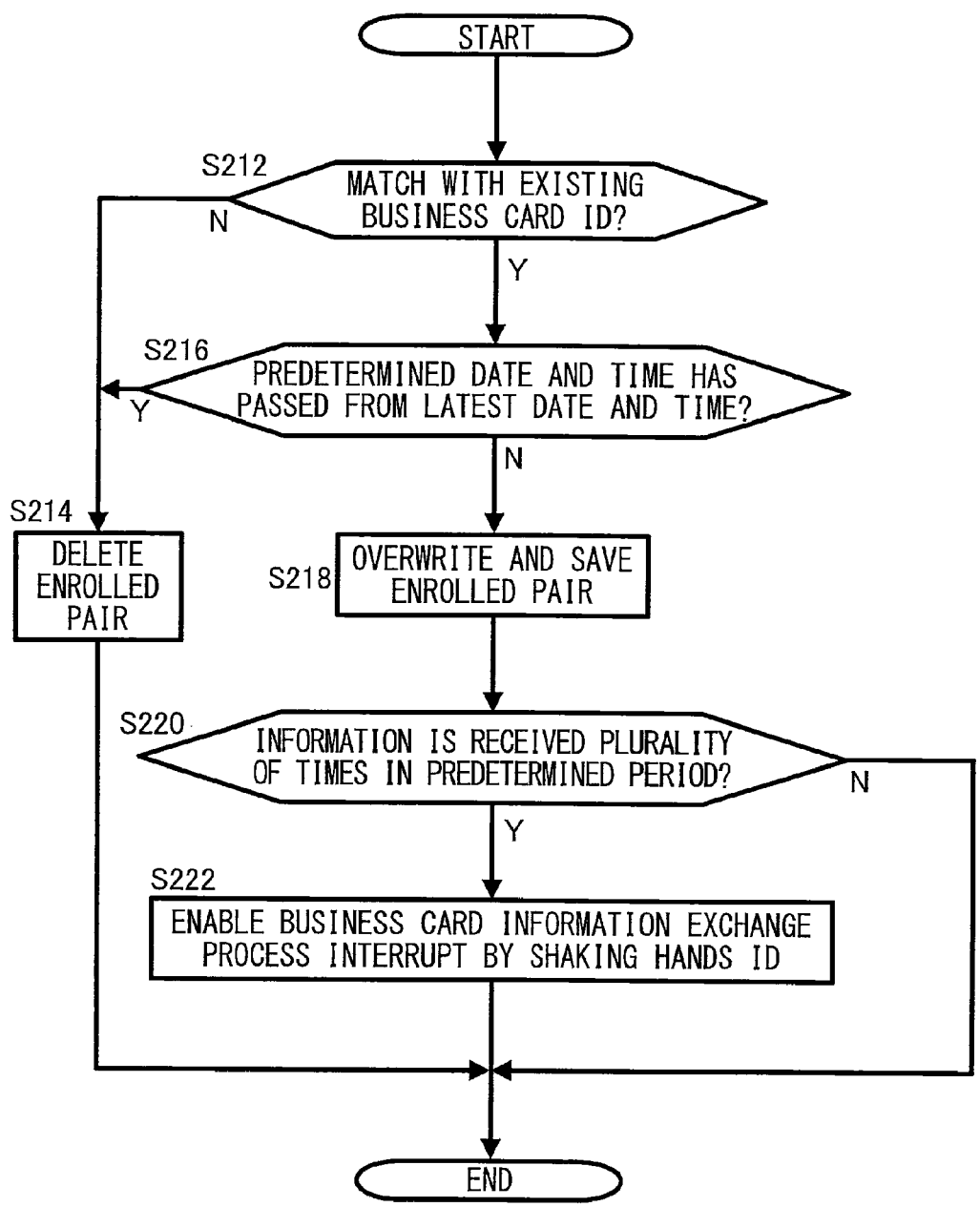
FIG. 8 is a flowchart illustrating details of Step S190 in FIG. 7.

FIG. 8 is a flowchart illustrating details of the corresponding enrolled pair saving or deleting process in Step S190 of FIG. 7. First, in Step S212, it is checked whether or not an ID of an opponent of the corresponding enrolled pair matches an existing business card ID. This means to check whether or not the opponent has exchanged business cards in the past. If there is no matching with an existing business card ID, the process flow goes to Step S214 so as to erase the corresponding enrolled pair, and the process flow is finished.

On the contrary, if a matching with an existing business card ID is detected in Step S212, the process flow goes to Step S216 so as to check whether or not a predetermined date and time (e.g., six months) has passed from a latest date and time of the business card exchange. If it is old so that the predetermined date and time has passed, the process flow goes to Step S214 so as to delete the corresponding enrolled pair, and the process flow is finished.

If it is confirmed in Step S216 that the predetermined date and time has not passed, the process flow goes to Step S218 so as to overwrite and store the corresponding enrolled pair, and the process flow goes to Step S220. This is because if the opponent has exchanged business cards and the information is relatively new, the security risk is small even if the business card information of the opponent leaks, so that it is reasonable to maintain the enrollment. Further, if there is a change in the content, it is possible to do maintenance of the enrollment in Step S218. To maintain the storage of the enrolled pair with the opponent having little risk by the process of Step S218 has a meaning that next exchange of business card information with the opponent can be performed promptly only by setting the business card exchange mode.

In Step S220, it is checked whether or not the business card information has been received from the opponent of the enrolled pair a plurality of times in a predetermined period (e.g., recent one year). If it is true, the process flow goes to Step S222. The case corresponding to Step S222 means, first, that it is confirmed in Step S216 that the latest reception of the business card information was performed in six months, and the previous reception of the business card information was performed in a year, so that the opponent has a business relationship to meet frequently.

Therefore, in this case, the process flow goes to Step S222 so as to enable a business card information exchange interrupt by a shaking hands ID, and the process flow is finished. In addition, if a plurality of times of reception of information in a predetermined period cannot be confirmed in Step S220, the process flow is finished promptly.

The specific function in Step S222 is to enable the interrupt for starting the process flow in FIG. 5 promptly when it is found that the opponent is an opponent satisfying the condition of Step S220 by exchanging IDs by the shaking hands. Therefore, if the opponent is enabled to interrupt by the process of Step S222, the process flow of Step S78 and the following steps in FIG. 4 can be performed from the process flow of FIG. 5 only by shaking hands without selecting the business card exchange mode.

In this case, since the opponent has meetings frequently, it is assumed that in actually performing the process flow of FIG. 4, the process flow goes via Step S88 and Step S90 directly to Step S94, so as to accumulate simply date and time of meeting in the ID file log in many cases.

Figure 9:
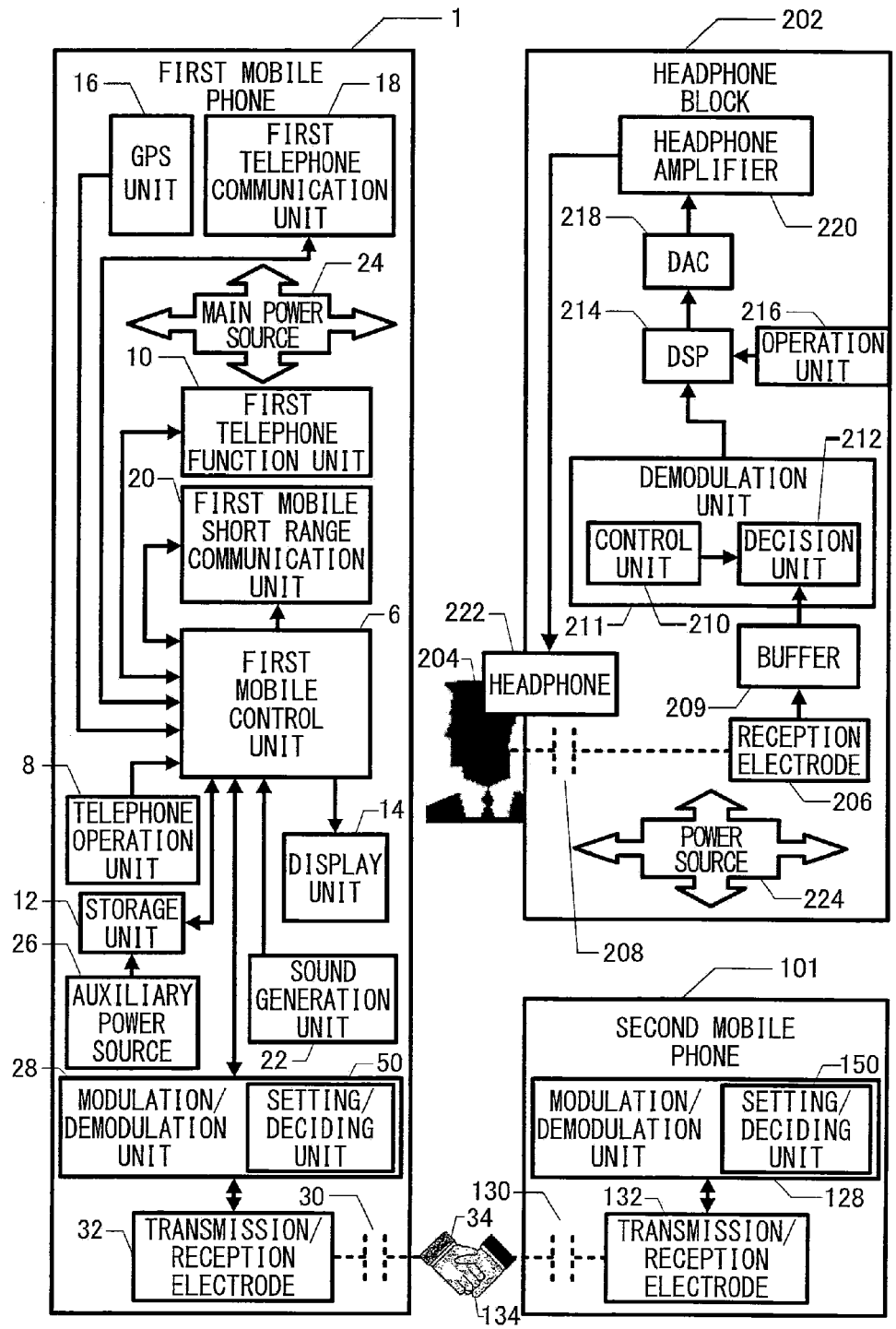
FIG. 9 is a block diagram illustrating Example 2 of an information exchange system according to an embodiment of the present invention.

FIG. 9 is a block diagram illustrating Example 2 of the information exchange system according to an embodiment of the present invention. Example 2 has the structure in which a headphone block 202 is added to the structure of Example 1 illustrated in FIG. 1.

Therefore, since the structure of the first mobile phone 1 illustrated in FIG. 9 is similar to that illustrated in FIG. 1, the structures are denoted by the same numeral, so that descriptions of elements will be omitted except for the modulation/demodulation unit 28 that will be described later. In addition, the structure of the second mobile phone 101 illustrated in FIG. 9 is also similar to that illustrated in FIG. 1. In order to avoid redundancy, elements except a modulation/demodulation unit 128 and a transmission and reception electrode 132 are omitted in the diagram, and descriptions thereof are also omitted.

As described above with reference to FIG. 1, the person of the human body 34 (not shown except for the right hand part) is the owner of the first mobile phone 1. The capacitance coupling 30 between the human body 34 and the transmission and reception electrode 32 enables the modulation/demodulation unit 28 to apply a transmission signal. In FIG. 1, the case where the first mobile phone 1 is held by the left hand (not shown) of the human body 34 so that the capacitance coupling 30 is formed between the left hand and the transmission electrode 32 is illustrated. However, if the first mobile phone 1 is in a pocket of clothes or the like so as to be close to skin of the human body 34, it is possible to form the capacitance coupling 30 for transmitting and receiving a signal between the transmission/reception electrode 32 and the skin of the human body 34 via the clothes by setting appropriate sensitivity.

In Example 2 of FIG. 9, a music signal is output from the first mobile control unit 6, and this signal is modulated by the modulation/demodulation unit 28 and then is applied to the human body 34 as a transmission signal by the above-mentioned capacitance coupling 30. In addition, this music signal is listened to with the headphone block 202.

The headphone block 202 is a wireless headphone that is mounted on a head 204 of the person of the human body 34. When a music signal applied to the human body 34 propagates through skin of the human body 34 to reach the head 204, this signal is received by a reception electrode 206 via a capacitance coupling 208 between the reception electrode 206 and the head 204.

The music signal received by the reception electrode 206 is supplied to a decision unit 212 of a demodulation unit 211 that is controlled by a control unit 210 via a buffer 209. The control unit 210 controls the entire function of the demodulation unit 211 of the decision unit and has a storage unit for storing data or the like necessary for decision performed by the decision unit 212.

The decision unit 212 is a unit for deciding whether or not the received modulated signal is suitable for reception, and details thereof will be described later. If the music signal is decided to be suitable for reception by the decision unit 212, it is demodulated by the demodulation unit 211 and is sent to a digital signal processor 214.

The digital signal processor 214 performs signal processing such as sound output adjustment and the like based on a manual operation of an operation unit 216 and outputs a digital music signal after the processing to a DA converter 218. An analog music output from the DA converter 218 is amplified by a headphone amplifier 220, and then is output as stereo music from a headphone 222 for left and right ears to left and right ears of the head 204.

The headphone block 202 is independent of the first mobile phone 1 and has a special power source unit 224 that is supplied with power from a battery.

Note that the headphone block 202 can be constituted as a pair of independent earphone blocks for left and right ears by downsizing. In this case, each of the left and the right earphone blocks has the same structure as the headphone block 202.

Next, detailed structures of the modulation/demodulation unit 28 of the first mobile phone 1, the modulation/demodulation unit 128 of the second mobile phone 101 and the demodulation unit 211 of the headphone block 202 illustrated in FIG. 9 will be described. The modulation/demodulation unit 28 of the first mobile phone 1 and the modulation/demodulation unit 128 of the second mobile phone 101 include setting/deciding units 50 and 150, respectively. On the other hand, the demodulation unit 211 of the headphone block 202 includes the decision unit 212. These works together to as to output music to a specific headphone block and to prevent an unexpected sound signal from entering the headphone block.

The modulation/demodulation unit 28 of the first mobile phone 1 and the modulation/demodulation unit 128 of the second mobile phone 101 have the same structure, so that they will be described mainly based on the setting/deciding unit 50 and the decision unit 212.

First, the music signal is output from the first mobile control unit 6 and supplied to the modulation/demodulation unit 28. Then, the setting/deciding unit 50 performs channel setting, header setting and encryption setting. Based on these setting, the music signal is modulated and is applied to the human body 34 as the transmission signal via the capacitance coupling 30.

The setting in the setting/deciding unit 50 is performed for output of music to a specific headphone block and for preventing an unexpected signal sound from entering the headphone block. If the channel does not match, or if the header part does not match, or if encryption cannot be decoded, leak of the transmission signal to the opponent via the human body communication is prevented.

The music signal applied to the human body 34 reaches the head 204 through skin of the human body 34, is received by the reception electrode 206 and is supplied to the decision unit 212 via the buffer 209. The decision unit 212 decides the channel and the header part of the music signal and decode the encryption part. Thus, only the music signal having the matched channel and header part and decodable encryption is output from the demodulation unit 211 to the digital signal processor 214.

Thus, only the music signal that is truly output from the first mobile phone 1 is output from the headphone 222, and it is possible to prevent a situation in which accidental contact with other person causes a music to which the other person listening to enter the headphone 222 in a mixed manner.

Here, the function of the buffer 209 will be described supplementarily. The modulation/demodulation unit 28 of the first mobile phone 1 adds the header part set by the setting/deciding unit 50 to a unit digital signal (packet) to be sent and repeats this a predetermined times (e.g., five times) so as to output to the transmission and reception electrode 32, which is held in the buffer 209. The decision unit 212 reads the same predetermined number (e.g., five) of unit digital signals held in the buffer 209 one by one and decides the same. If the channel and the header part are matched, the predetermined number of unit digital signals are processed each other for error correction and the like, and are output to the digital signal processor 214. Note that it is possible not to perform the error correction and to output a first leading unit digital signal having matched channel and header part promptly to the digital signal processor 214, while discarding other same unit digital signals.

With the above-mentioned structure, it is possible to cope with a situation such that an unknown signal having an accidental or a malicious identical channel enters the reception electrode 206 in a mixed manner by an unexpected contact with others, and overlays the header part reception timing of the unit digital signal.

Although, in such a case, the header part of the unit digital signal cannot be recognized as a correct one despite that the signal is an authentic transmission signal from the first mobile phone 1, if the header part that is received at another timing among the same predetermined number of unit digital signals can be recognized to be correct, this unit digital signal can be adopted and can be output to the digital signal processor 214.

The above-mentioned structure is useful also for the case where an unknown signal overlaps any of data parts of the encrypted same predetermined number of unit digital signals so that decoding cannot be performed. In other words, if the same data received at other timing can be decoded, this can be output to the digital signal processor 214.

Note that any one of the channel setting, the header setting and the encryption setting by the setting/deciding unit 50 can be omitted in accordance with a type of the transmission signal. In addition, the setting thereof may be managed in different manners in accordance with types of the transmission signals. The types of the transmission signals include music transmission as described above, transmission of electronic mail and the like. Details of handling and setting management of these signals will be described later.

The above describes the case where the user listen to music output from the first mobile phone 1 via the user's own body 34 with the headphone block 202 mounted on the user's own head 204. However, it is also possible, for example, to listen to music output from lover's second mobile phone 101 by grasping a hand of the lover's body 134 with the user's headphone block 202 by sharing music.

On the contrary, by grasping a hand of the lover's body 134, it is possible to let the lover listen to music output from the user's first mobile phone 1 with a similar headphone block mounted on the lover's head by sharing music.

In the case of the sharing of music between lovers, they should have the same channel setting, the same header setting and the same encryption setting.

Note that in the case of the sharing of music, the user may have only the headphone block 202 without a music source device like the first mobile phone 1, or vice versa. Further, sharing of information via the human body communication may be performed not only by grasping a hand but also by sitting close to each other on a bench which also generate capacitance coupling.

Figure 10:
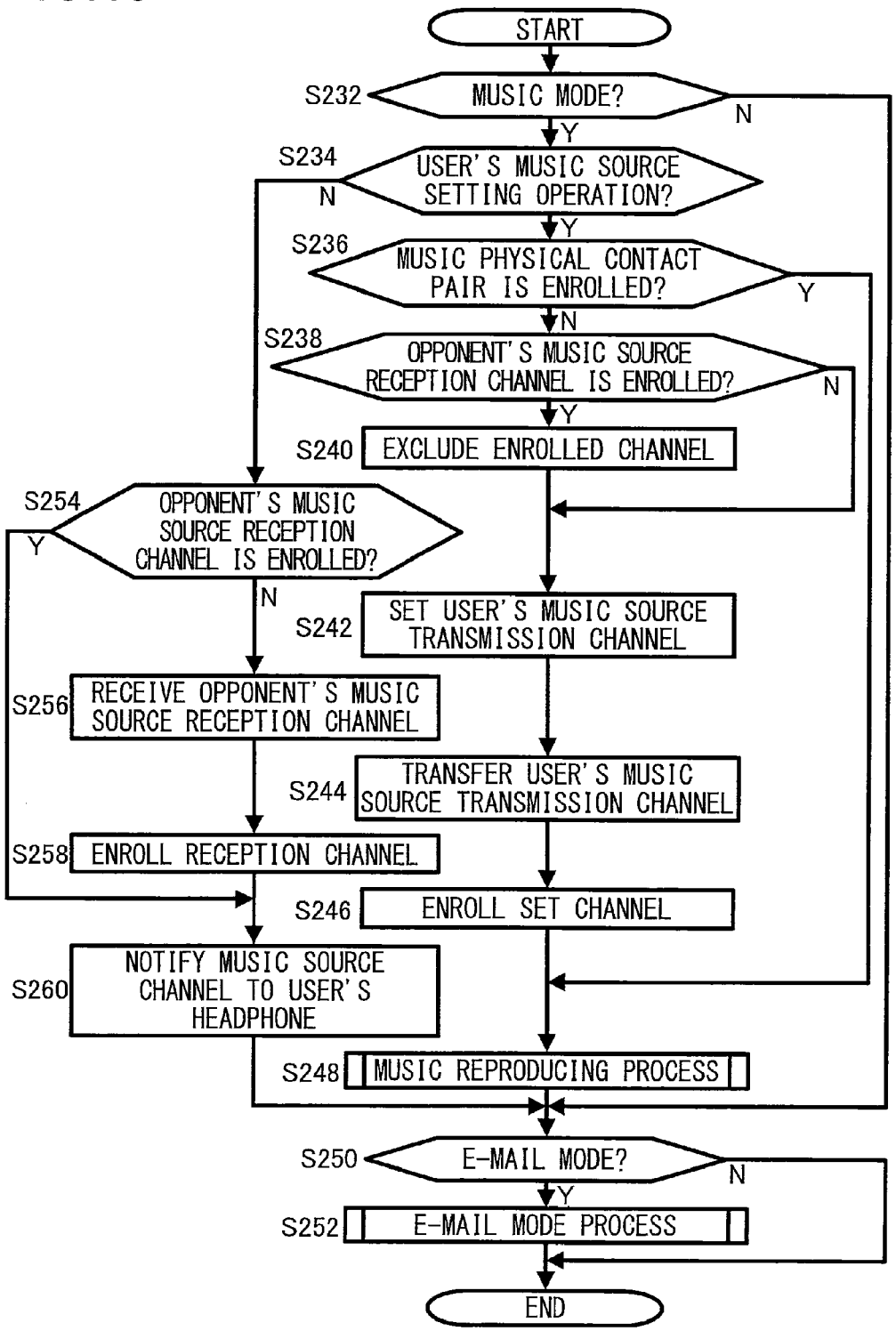
FIG. 10 is a flowchart illustrating details of Step S18 in FIG. 2.

FIG. 10 is a flowchart illustrating details of the physical contact mode process in Step S18 of FIG. 2, which is based on the structure illustrated in FIG. 9. The physical contact mode process is a mode that enables to exchange e-mail information or to share music reproduction information via human body communication in a physical contact state of grasping hands with each other or sitting close to each other.

When the process flow starts, it is checked in Step S232 whether or not the physical contact mode is the music mode. If it is the music mode, the process flow goes to Step S234 in which it is checked whether or not setting operation has been performed for sharing a music source output from the first mobile phone 1 that is the user's mobile phone.

If the user's music source setting operation has been performed, it is checked in Step S236 whether or not the opponent who is trying to share music and the user are enrolled as a music physical contact pair. If the enrollment has not been performed, the process flow goes to Step S238.

In Step S238, it is checked whether or not the channel for receiving the sound source of the opponent is enrolled. If it is enrolled, the channel is automatically excluded in Step S240. Then, in Step S242, a channel for transmitting the user's sound source is automatically selected and set from channels except the excluded channel. Further, if it is not detected in Step S238 that opponent's music source reception channel is enrolled, the process flow goes directly to Step S242 without considering the channel to be excluded.

The user's music source transmission channel set in Step S242 is transmitted to the second mobile phone 101 that is the opponent's mobile phone in Step S244 and is enrolled in the storage unit 12 of the first mobile phone 1 that is the user's mobile phone in Step S246.

Further, the transmission of the channel in Step S244 is performed from the first mobile short range communication unit 20. Instead of this, however, it is possible to perform by grasping the opponent' hand via the human body communication.

As described above, the channel for supplying the user's music source to the opponent is set, and the opponent is informed of it. Then, the process flow goes to Step S248 so as to start a music reproducing process. Details of it will be described later.

On the contrary, if it is detected in Step S236 that the music physical contact pair is enrolled, it means that the channel for transmitting the user's music source is already set, and it is already transmitted to the opponent. Therefore, the process flow goes directly to Step S248 for the music reproducing process.

When the music reproducing process is finished, the process flow goes to Step S250, in which it is checked whether or not the physical contact mode is an e-mail mode. On the contrary, if it is not detected in Step S232 that the current mode is the music mode, the process flow directly goes to Step S250. Although it is usual that the process flow of FIG. 10 goes from Step S232 to Step S250, Step S250 is placed after Step S248 so as to enable to enter the e-mail mode after the music mode.

If it is detected in Step S250 that the current mode is the e-mail mode, the process flow goes to Step S252 so as to perform the e-mail mode process. When the process is finished, the process flow is finished. Details of the e-mail mode process in Step S252 will be described later.

On the contrary, if the user's music source setting operation is not detected in Step S234, it corresponds to the case of the music mode in which the music source output from the opponent is shared. Therefore, the process flow goes to Step S254. In Step S254, it is checked whether or not the channel for receiving the opponent's music source is enrolled in the storage unit 12.

If it is not enrolled, the process goes to Step S256 so as to receive the channel for receiving the music source from the opponent's mobile phone. This reception of the channel from the opponent is performed by the first mobile short range communication unit 20. Instead of this, however, it may be performed by grasping the opponent's hand via the human body communication.

When the opponent's music source reception channel is received in Step S256, the process flow goes to Step S258 in which the received channel is enrolled in the storage unit 12, the opponent's music source reception channel is notified to the headphone block 202 that is the user's headphone in Step S260. The notified reception channel is stored in the storage unit of the control unit 210.

If the opponent's music source is to be shared, after the process described above, the process flow goes to Step S250. The process after that is the same as the case where the user's music source is shared.

Figure 11:
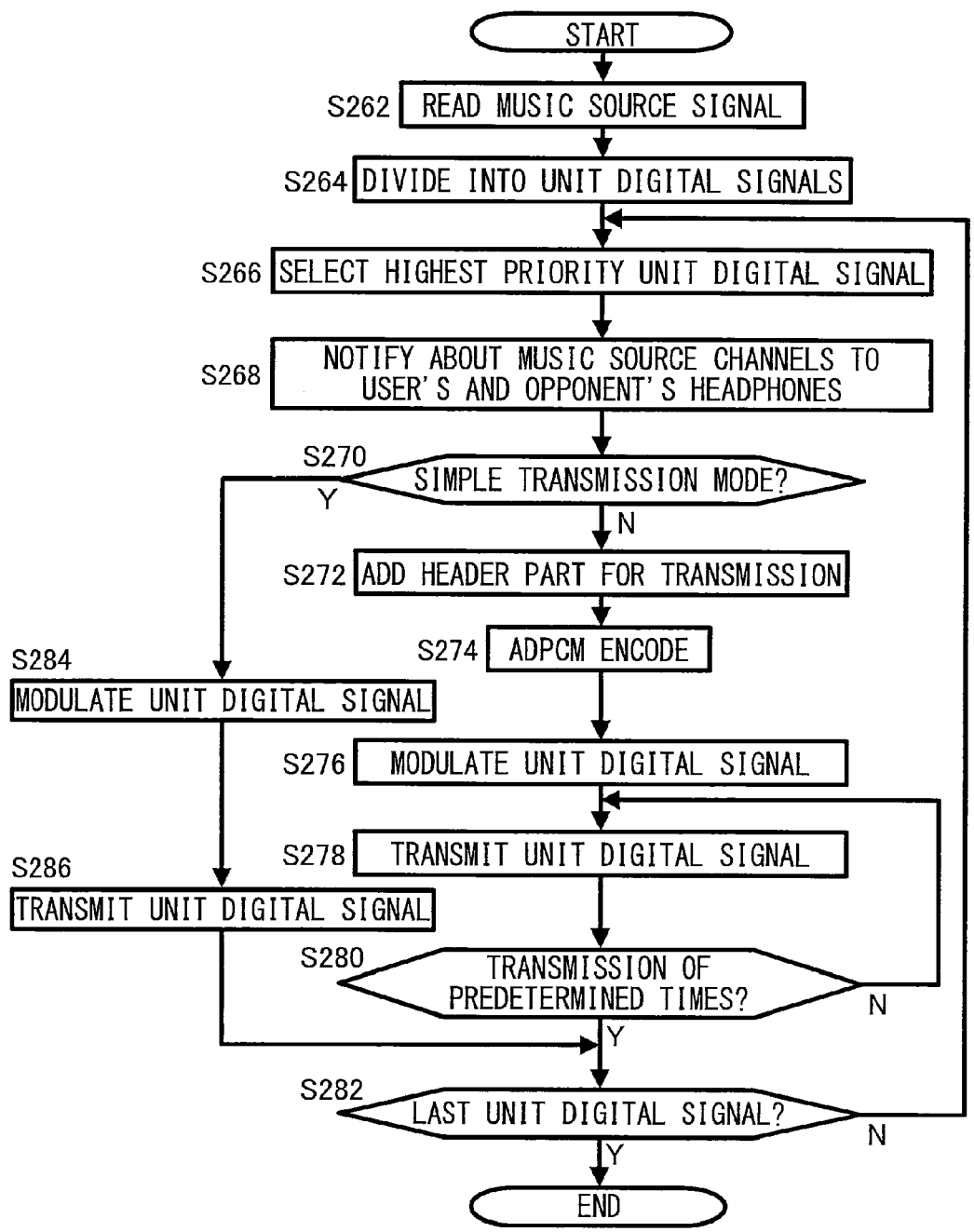
FIG. 11 is a flowchart illustrating details of Step S248 in FIG. 10.

FIG. 11 is a flowchart illustrating details of the music reproducing process in Step S248 of FIG. 10, which is based on the structure of FIG. 9. When the process flow starts, the music source signal is retrieved from the storage unit 12 in Step S252. The retrieved music source signal is divided into unit digital signals in Step S264, and a unit digital signal having a highest temporal priority is selected automatically in Step S266.

Next, in Step S268, the channel for transmitting the music source is notified to the user's and opponent's headphones. This is the same function as Step S260 in FIG. 10, and the notification of the music source channel for each transmission of the unit digital signal to headphones enables a headphone which joins to share the music source at the midpoint of the music reproduction to obtain the information of the music source transmission channel.

Next in Step S270, it is checked whether or not a simple transmission mode is set. If the simple transmission mode is not set, the process flow goes to Step S272 in which an instruction is issued for adding a header part for transmission to the unit digital signal. Further, an instruction is issued in Step S274 for encoding the unit digital signal with the header part by ADPCM (Adaptive Differential Pulse Code Modulation). This has meaning of compressing the signal and encrypting the same.

After the above-mentioned process, modulation of the unit digital signal is instructed in Step S276, and the transmission of the same is instructed in Step S278. When the transmission is finished, it is checked in Step S280 whether or not the transmission has been performed a predetermined times (e.g., five times). If it has not performed the predetermined times yet, the process flow goes back to Step S278. After that, the transmission in Step S278 is repeated until it is detected in Step S280 that the transmission has been performed the predetermined times.

If it is detected in Step S280 that the transmission has been performed the predetermined times, the process flow goes to Step S282, and it is checked whether or not the unit digital signal that was transmitted the predetermined times in the process of Step S278 and Step S280 is the last one of the music.

Then, if it is not the last one, the process flow goes back to Step S266 so as to select a unit digital signal to have a highest priority except for ones that have been transmitted. After that, the process from Step S266 to Step S282 is repeated until it is detected in Step S282 that the last unit digital signal is transmitted the predetermined times.

On the contrary, if the simple transmission mode setting is detected in Step S270, the process flow goes to Step S284, so as to instruct to modulate the unit digital signal selected in Step S266 as it is, and to instruct to transmit the same in Step S286.

Then, it is checked whether or not the unit digital signal transmitted in Step S282 is the last one of the music. If it is not the last one, the process flow goes back to Step S266 so as to select a unit digital signal to have a highest priority except for ones that have been transmitted. After that, in the same manner, Step S266 to Step S270, Step S284, Step S286 and Step S282 are repeated until it is detected in Step S282 that the last unit digital signal is transmitted the predetermined times.

The above-mentioned simple transmission mode is a mode for supporting a simplified headphone block that is constituted to be able to share and enjoy the music transmitted via the human body communication only by adjusting the transmission channel without checking the header part or an encryption decoding function. In this way, security of the signal transmitted and received by the human body communication can be changed in accordance with a purpose of the signal transmission. This change may be performed in accordance with the content such as music or e-mail to be transmitted.

With the structure described above, a signal with an unmatched channel, and for higher security, a signal with an unmatched header part, and a signal whose encryption cannot be decoded do not leak to an unexpected opponent in accordance with the degree of security. In addition, it is also possible to prevent an unexpected sound signal from entering the headphone block in a mixed manner.

Figure 12:
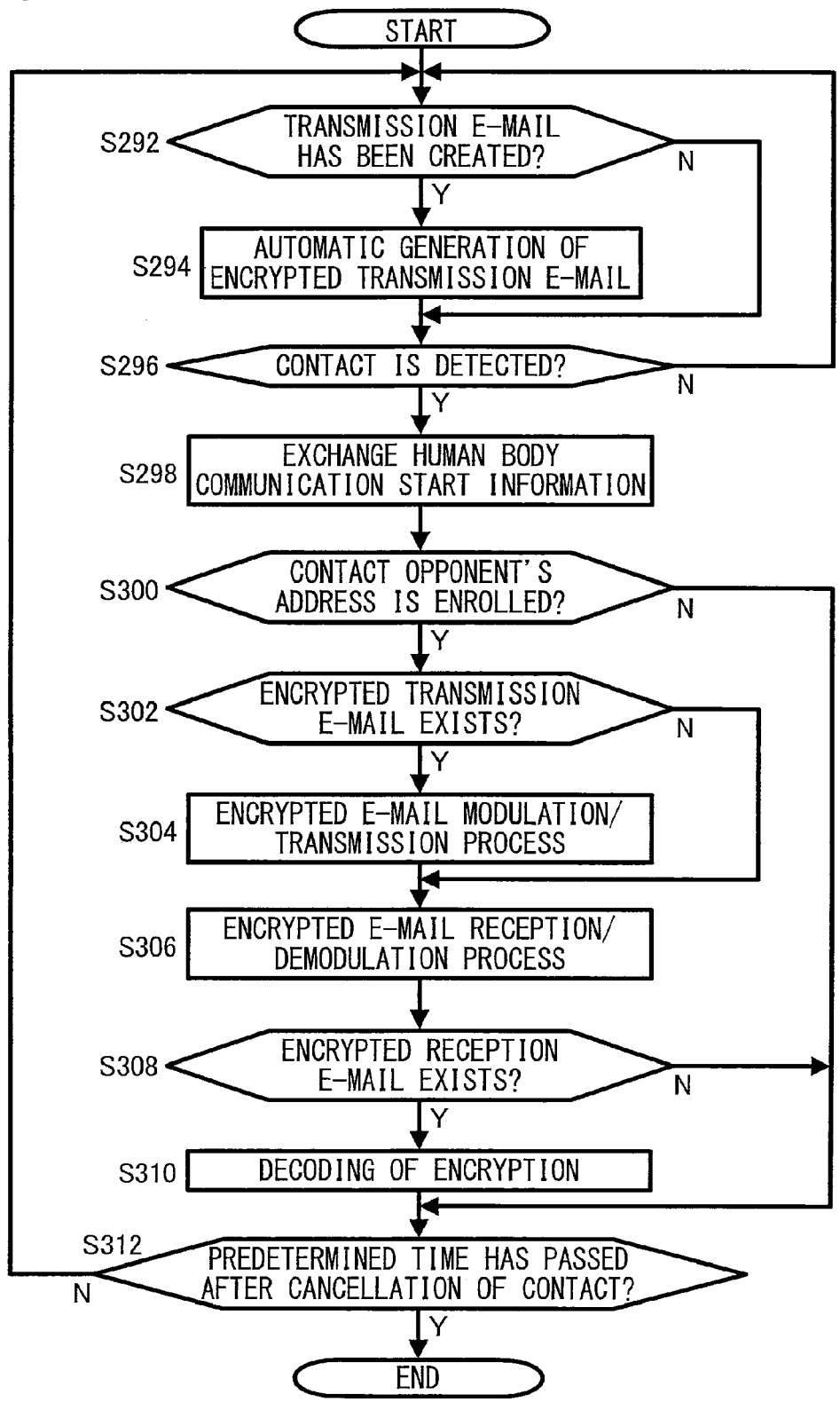
FIG. 12 is a flowchart illustrating details of Step S252 in FIG. 10.

FIG. 12 is a flowchart illustrating a detail of an e-mail mode process in Step S252 of FIG. 10, which is based on the structure FIG. 9. When the process flow starts, it is checked in Step S292 whether or not e-mail to be transmitted is prepared. If the e-mail is prepared, the process flow goes to Step S294, and the prepared e-mail is encrypted so as to generate transmission e-mail automatically. Then, the process flow goes to Step S296. On the contrary, if it is not detected in Step S292 that the transmission e-mail is prepared, the process flow directly goes to Step S296.

In Step S296, it is detect whether or not the user's body is contacted with other human body. If it is not detected, the process flow goes back to Step S292. After that, the process from Step S292 to Step S296 is repeated until the contact is detected.

Note that the contact detection in Step S296 is based on the function of detecting presence or absence of a contact state, which can detect not only start of contact but also cancellation of contact. The process flow goes from Step S296 to Step S298 based on the detection of start of contact.

If a contact is detected in Step S296, the process flow goes to Step S298. In this case, there are the cases including one where encrypted transmission e-mail is generated in Step S294 and the other where the same is not generated. Methods of coping with the cases will be described later.

In Step S298, information for starting the human body communication is exchanged. Then, based on the exchanged information, it is checked in Step S300 whether or not an address of the contact opponent is enrolled. Management of the enrollment will be described later.

If it is detected in Step S300 that the address of the contact opponent is enrolled, the process flow goes to Step S302 in which it is checked whether or not the encrypted transmission e-mail is generated in Step S294. Then, if there is encrypted transmission e-mail, the process flow goes to Step S304, in which it is instructed to modulate the encrypted transmission e-mail for the human body communication and to transmit the same, and the process flow goes to Step S306. On the contrary, if encrypted transmission e-mail is not detected in Step S302, the process flow directly goes to Step S306.

In Step S306, it is tried to receive encrypted e-mail by the human body communication from outside of the user's body, and if there is encrypted e-mail, an instruction is issued to demodulate it. Next in Step S308, it is checked whether or not there is demodulated encrypted e-mail. If there is the e-mail, the process flow goes to Step S310 so as to decode the encryption, and the process flow goes to Step S312.

On the contrary, if encrypted e-mail is not detected in Step S308, the process flow directly goes to Step S312. In addition, if enrollment of the address of the contact opponent cannot be confirmed in Step S300, the process flow directly goes to Step S312.

In Step S312, it is checked whether or not a predetermined time (e.g., 10 minutes) has passes from the detection of cancellation of contact by the contact detection function in Step S296. Then, if the predetermined time has not passed, the process flow goes back to Step S292, in which the process from Step S292 to Step S312 is repeated. Further, if start of a new contact state is detected in Step S296 during the repeat, count of the lapse time in Step S312 is reset, and count is newly started from cancellation of the next contact state. On the contrary, if it is detected in Step S312 that the predetermined time has passed, the process flow is finished.

As described above, exchange of e-mail is automatically triggered when lovers grasp hands with each other, for example, so that the exchange of e-mail by the human body communication can be performed. In addition, if grasping of hands is not detected for a predetermined time (e.g., 10 minutes), the process flow of FIG. 12 is finished so that the physical contact mode is automatically cancelled.

Figure 13:
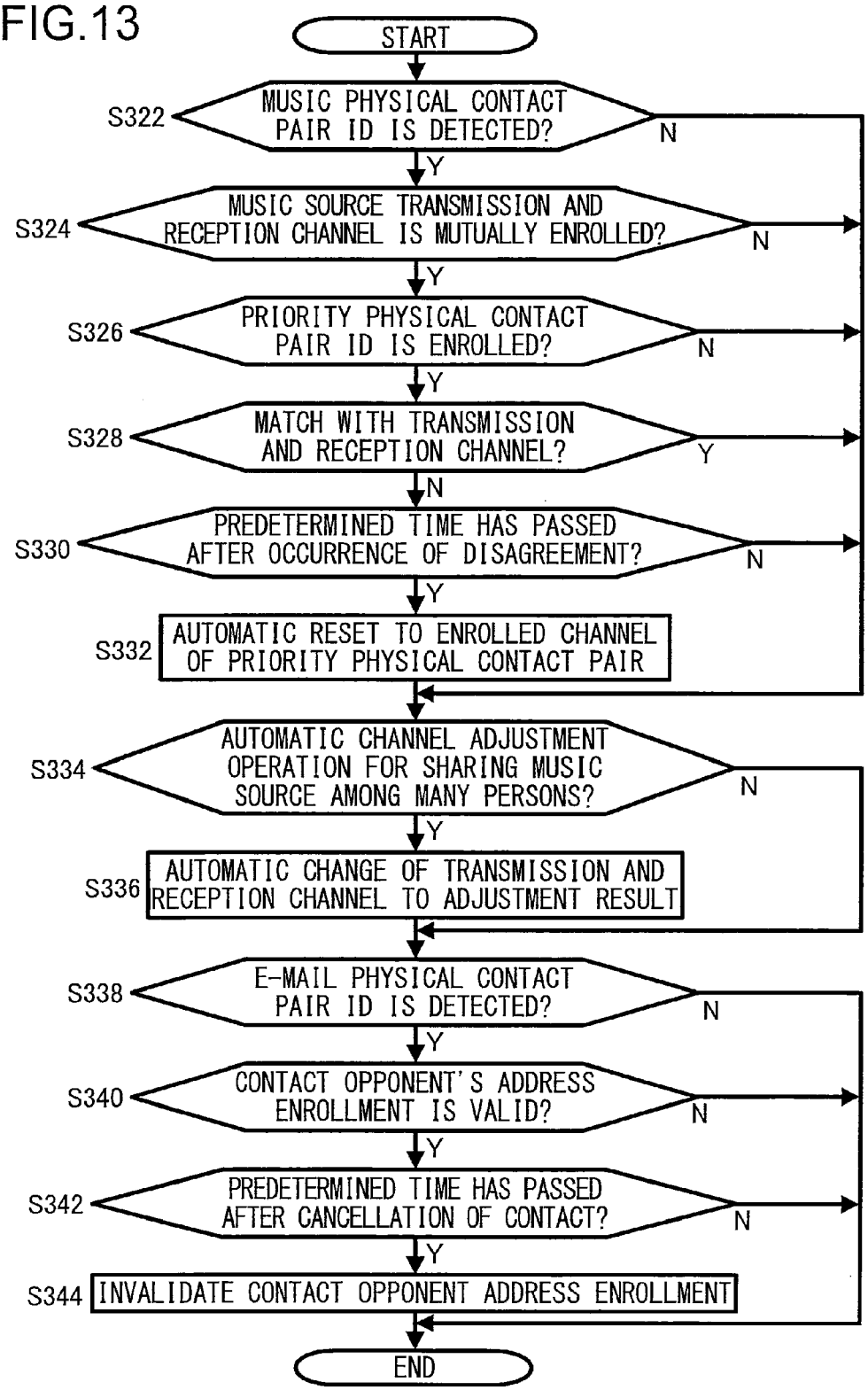
FIG. 13 is a flowchart illustrating details of Step S200 in FIG. 7.

FIG. 13 is a flowchart illustrating details of the physical contact pair management process in Step S200 of FIG. 7, which is based on the structure FIG. 9. When the process flow starts, it is checked whether or not an ID of the music physical contact pair is detected in Step S322. Then, if it is detected, the process flow goes to Step S324 in which it is checked whether or not a channel for transmitting and receiving the music source in the pair is mutually enrolled.

If the channel for transmitting and receiving the music source is mutually enrolled in the pair having the detected ID, it means that as long as the pair concerned, the music source can be shared mutually without interference by using the enrolled channel.

If it is detected in Step S324 that the channel for transmitting and receiving the music source in a specific pair is mutually enrolled, the process flow goes to Step S326, in which it is checked whether or not there is a pair among them in which the ID is enrolled as a priority physical contact pair. If it is true, the process flow goes to Step S328. Note that if only one ID is detected of the physical contact pair in which the channel for transmitting and receiving the music source is mutually enrolled, this is regarded to be enrolled as the priority physical contact pair, and the process flow goes to Step S328.

In Step S328, it is checked whether or not the currently set channel matches the channel that is enrolled as the channel of the priority physical contact pair. Then, if it does not match, the process flow goes to Step S330, in which it is checked whether or not a predetermined time (e.g., one day) has passed from the occurrence of the disagreement.

If it is detected in Step S330 that the predetermined time has passed, the process flow goes to Step S332, in which the currently set channel is automatically reset as the enrolled channel of the priority physical contact pair, and the process flow goes to Step S334.

On the contrary, if at least one of Step S322 to Step S326 and Step S330 is not true, or if it is true in Step S, the process flow directly goes to Step S334.

As described above, if the ID and the music source transmission and reception channel are enrolled as the priority physical contact pair, it is automatically reset to the enrolled channel under the condition without any obstacle for changing the currently set channel freely. In other words, in the case of an intimate physical contact pair such as lovers, it is not necessary to reset the channel to the enrolled channel every time when the channel is changed and left.

In Step S334, it is checked whether or not there is an operation requesting a channel automatic adjustment in the case where many (three or more) persons share the music source. Then, if the operation is detected, the process flow goes to Step S336 so as to change automatically the transmission and reception channel to the channel determined by the adjustment result, and the process flow goes to Step S338. On the contrary, if it is not true in Step S334, the process flow directly goes to Step S338.

Next, the above-mentioned function from Step S322 to Step S336 will be described with reference to a specific example in which there is a group of friends A, B, C and D, and among them A and B are lovers while C and D are lovers, in each of which the enrollment as the priority physical contact pair has been performed.

Note that it is supposed as follows. In the priority physical contact pair A and B, a first channel is enrolled for transmission from A to B, and a second channel is enrolled for transmission from B to A. On the other hand, in the priority physical contact pair C and D, a first channel is enrolled for transmission from C to D, and a second channel is enrolled for transmission from D to C.

In this case, there is no problem if each physical contact pair shares the music source in the pair. However, supposing that all members of the group of friends A, B, C and D share the music source of A, the same channel is used for all transmissions from A to B, from A to C, and from A to D. The same is true for the case where the music source of B, C or D is shared in the group.

The operation in Step S334 is performed in this case. When the process flow goes to Step S336, the short range communication is performed mutually among A, B, C and D so that automatic adjustment of the channel is performed. For instance, a first channel is assigned to transmission from the music source of A, a second channel is assigned to transmission from the music source of B, a third channel is assigned to transmission from the music source of C, and a fourth channel is assigned to transmission from the music source of D, which are automatically changed. Thus, A, B, C and D can share a desired music source by selecting one of the first to the fourth channels as the reception channel.

Note that the music source sharing function in the group can be utilized not only in the human body communication but also in other communication such as the short range communication.

When the change function in Step S336 works, the transmission channel of C is changed from the first channel to the third channel, and the transmission channel of D is changed from the second channel to the fourth channel, for example. When the music source transmission and reception channel enrolled in the priority physical contact pair is changed, the function of Step S332 resets it automatically to the enrolled channel.

Thus, for example, after sharing of music sources is enjoyed in a group travel by members A, B, C and D, the channel of the priority physical contact pair C and D, which was automatically changed during the travel, is reset to the enrolled one automatically the next day after coming home, as the music source transmission and reception channel in the pair.

In Step S338, it is checked whether or not the ID of the e-mail physical contact pair is detected. Then, if it is detected, the process flow goes to Step S340, and it is checked whether or not the enrollment for the human body communication about the e-mail address of the contact opponent is valid. Then, if the enrollment is valid, the process flow goes to Step S342, in which it is checked whether or not a predetermined time (e.g., 10 minutes) has passed from the cancellation of contact when the enrolled address is detected in Step S296 of FIG. 12.

If it is detected in Step S342 that the predetermined time has passed, the process flow goes to Step S344 to as to invalidate the enrollment for the human body communication about the e-mail address of the contact opponent. Note that this invalidation is performed only for the address enrollment of the human body communication detected in Step S300 of FIG. 12 so that the exchange of e-mail via the human body communication in Step S302 to Step S310 cannot be performed by the invalidation. In other words, only the address enrollment for exchanging e-mail via the human body communication triggered by the contact detection is invalidated, but the address enrollment for ordinary e-mail transmission is not invalidated.

On the contrary, if an ID of an e-mail physical contact pair is not detected in Step S338, and if there is no valid enrollment of a contact opponent address in Step S340, the process flow is finished promptly.

In addition, if the predetermined time has not passed yet in Step S344, the process flow is finished promptly while the enrollment of the contact opponent address is maintained.

Figure 14:
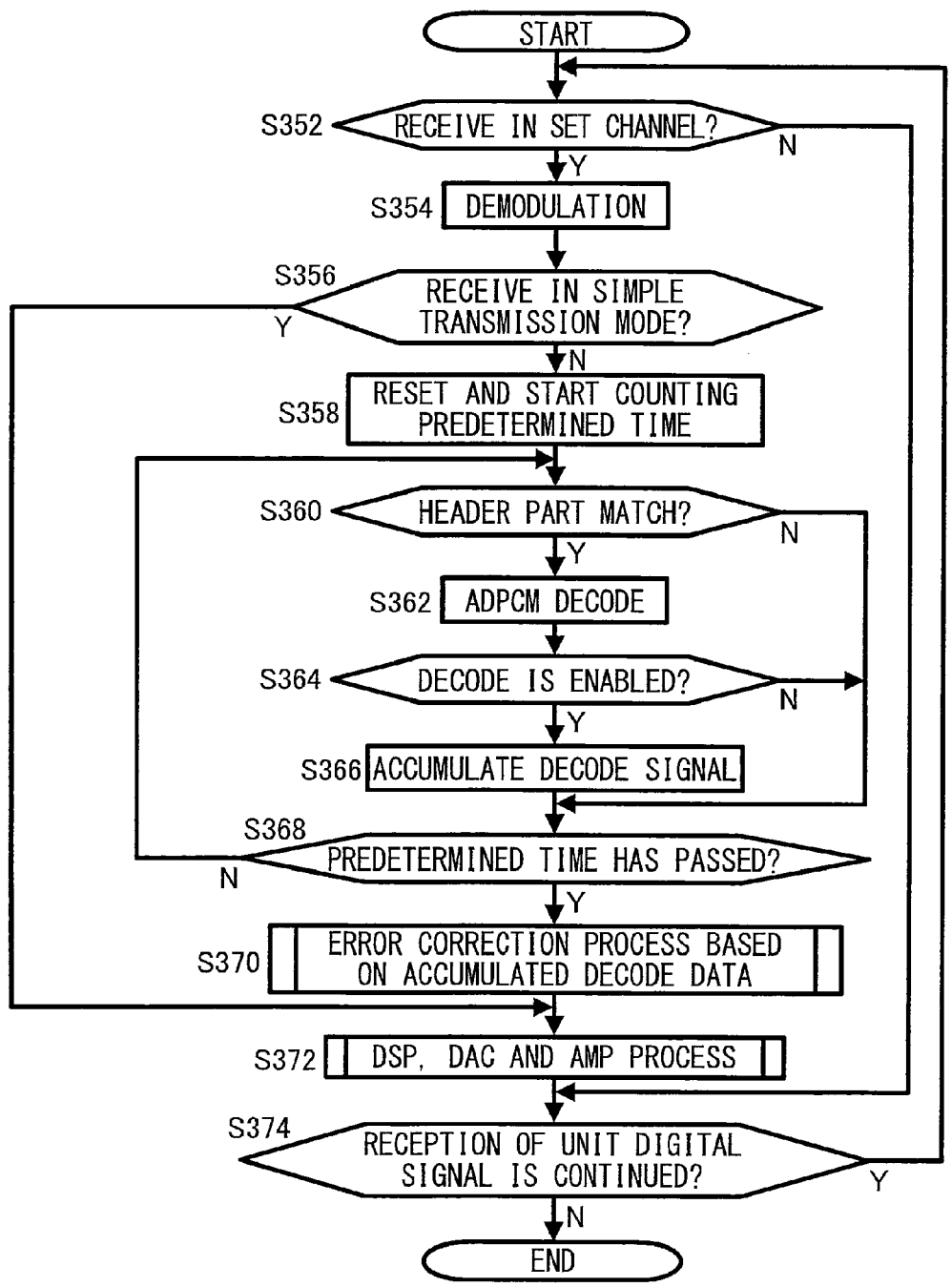
FIG. 14 is a flowchart of a function of a control unit of a headphone block of Example 2 in FIG. 9.

FIG. 14 is a flowchart of a function of the control unit 210 in the headphone block 202 illustrated in FIG. 9, and the process flow starts when a certain signal is received by the reception electrode. When the process flow starts, first in Step S352, it is decided by the decision unit 212 whether or not the reception is performed by the set channel. If it is the reception by the set channel, the process flow goes to Step S354 so as to perform demodulation.

Next, the process flow goes to Step S356 in which it is checked whether or not the reception is performed in the simple transmission mode. If it is confirmed in Step S356 that it is not the reception in the simple communication mode, the process flow goes to Step S358 in which a predetermined time count is reset and started, and the process flow goes to Step S360. The predetermined time for starting the count in Step S358 is set to a time value that is sufficient for transmitting repeatedly the same unit digital signal for a predetermined times in Step S278 and Step S280 of FIG. 11.

At that latest in this state, it is found that the received signal is a unit digital signal. Therefore, in the Step S60, it is checked whether or not the header part matches reference data that has been obtained in advance. Then, if the header part matches, ADPCM decode is performed in Step S362. In this decode, a predetermined coding rule that has been obtained in advance is used.

Next in Step S364, it is checked whether or not the decoding is enabled. If the received unit digital signal does not comply with a predetermined coding rule, the decoding is disabled. In this case, ADPCM encode has meaning of encryption, and ADPCM decode has meaning of decoding the encryption.

If it is checked in Step S364 that the decode is enabled, the process flow goes to Step S366 so as to accumulate the decoded unit digital signal, and the process flow goes to Step S368.

On the contrary, if matching of the header part cannot be detected in Step S360, or if the decode is disabled in Step S364, the process flow goes directly to Step S368 in which the received unit digital signal is discarded.

If the lapse of the predetermined time is not detected in Step S368, the process flow goes back to Step S360. After that, the process of Step S360 to Step S368 is repeated until the lapse of the predetermined time is detected in Step S368. Thus, the unit digital signal that has the matched header part and can be decoded is accumulated in Step S366 for the predetermined time. If the communication is performed normally, decode data of the same unit digital signal that has been transmitted repeatedly are included by a predetermined number in the accumulated data.

When a predetermined time has passed in Step S368, the process flow goes to Step S370. In Step S370, an error correction process is performed based on a plurality of unit digital signal data that are regarded as the same among the accumulated decode data, so that the unit digital signal for reproduction is obtained, and the process flow goes to Step S372. On the contrary, if it is detected in Step S356 that the reception is performed in the simple transmission mode, the received data is used as it is as the unit digital signal for reproduction, and the process flow directly goes to Step S372.

In Step S372, the process by the digital signal processor 214, the AD converter 218 and the headphone amplifier 220 is instructed, and thus an analog output signal for reproduction is output to the headphone 222.

Next, the process flow goes to Step S374, and it is checked whether or not the reception of the unit digital signal is continued. Then, if the reception is continued, the process flow goes back to Step S352, and the process from Step S352 to Step S374 is repeated until the continuation of the reception is not detected in Step S374.

Note that every time when the process flow goes to Step S358 by the above-mentioned repetition, the predetermined time count is reset and started so as to start the process of the next group of the same unit digital signal.

Hereinafter, various technical characteristics disclosed above will be summarized.

First, the first technical characteristic disclosed in the present specification is related to the information exchange device. As to the information exchange device, as described above, there are various methods are proposed conventionally (e.g., see Patent Documents 1 to 3).

However, in order to the information exchange, it is necessary that the opponent side also support the user's information exchange means, and there are things to be studied remaining for wide spread use thereof.

Therefore, the present specification discloses a first technical characteristic for providing the information exchange device that can perform smooth information exchange with the opponent side.

Specifically, the present specification discloses, as the first technical characteristic, an information exchange device including a human body communication unit which applies information flowing via a human body to a human body and detects information flowing via the human body (e.g., corresponding to the modulation/demodulation unit 28, the transmission/reception electrode 32, the modulation/demodulation unit 128, and the transmission/reception electrode 132 in FIG. 1), an information communication unit which communicates information via the human body communication unit (e.g., corresponding to the first mobile control unit 6, the storage unit 12, the second mobile control unit 106, and the storage unit 112 in FIG. 1), a sensing unit which senses presence of other devices that can support the function of the human body communication unit (e.g., corresponding to the first mobile control unit 6, the first mobile short range communication unit 20, the modulation/demodulation unit 28, the transmission and reception electrode 32, the second mobile control unit 106, the second mobile short range communication unit 120, the modulation/demodulation unit 128, and the transmission/reception electrode 132 in FIG. 1), and a notifying unit which notifies about a sensing result of the sensing unit (e.g., corresponding to the display unit 14, the sound generation unit 22, the display unit 114, and the sound generation unit 122 in FIG. 1).

This information exchange device is constituted as a mobile phone for example, and is suitable for exchanging business card information flowing via human bodies with hands tied between mobile phones.

In addition, according to the above-mentioned structure, it is informed by the notifying unit that the opponent's mobile phone supports the human body communication with each other without inquiring the opponent. Therefore, by natural self introduction with shaking hands with the opponent, the information exchange can be performed smoothly. In other words, if it is not known whether or not the opponent has a mobile phone supporting the human body communication, exchange of paper business cards may be performed first, and then shaking hands may be performed for finishing natural self introduction in any case.

In addition, the present specification discloses a structure, as a more specific technical characteristic, in which the sensing unit includes a wireless communication function unit, and the sensing is performed based on a radio wave that the wireless communication function unit receives. More specifically, the sensing unit performs the sensing based on intensity of a radio wave received by the wireless communication function unit. Thus, when the opponent approaches, it is found by each other that the opponent's mobile phone supports the human body communication.

In addition, the present specification discloses a structure, as another more specific technical characteristic, in which the sensing unit performs the sensing based on information transmitted by a radio wave received by the wireless communication function unit. Thus, for example, a code indicating to be a support type can be exchanged with each other so that the sensing can be performed.

In addition, the present specification discloses a structure, as another specific technical characteristic, in which the sensing unit performs the sensing based on information transmitted from the human body communication unit. In this way, for example, when shaking hands is performed, it is possible to sense whether or not to be a support type by whether or not the code indicating a support type can be transmitted.

In addition, the present specification discloses a structure, as another specific technical characteristic, in which a control unit is provided for adjusting a mutual relationship with the other device sensed by the sensing unit. More specifically, the information communication unit can determine the order of the information communication with other devices based on the control unit. Thus, the information exchange can be performed smoothly.

In addition, the present specification discloses a structure, as another more specific technical characteristic, in which the notifying unit performs the notification while adjusting a relationship with notification by other devices based on the control unit. Thus, when the notification is performed with sounds, it is possible to avoid the situation where a relationship with other notifications performed by the other notifying unit is mixed so that the notification cannot be recognized.

In addition, the present specification discloses a structure, as another specific technical characteristic, including an operation unit which determines the enabled or disabled state of communication by the human body communication unit, and the sensing unit can perform the sensing regardless of the enabled or disabled state of communication by the human body communication unit. Thus, it is possible to avoid a situation where the sense cannot be performed depending on an operation state of the information exchange device.

In addition, the present specification discloses a structure, as another specific technical characteristic, including a notifying unit which notifies about completion of the information exchange by the information communication unit. Thus, it is possible to confirm that the information exchange has been performed securely by the human body communication.

In addition, the present specification discloses a structure, as another specific technical characteristic, including a notifying unit which warns that the information exchange by the information communication unit is not completed. Thus, it is found that the information exchange has not been completed because the period of the shaking hands or the like was short.

Therefore, it is possible to perform shaking hands or the like so that the information exchange is performed.

In addition, the present specification discloses a structure, as another technical characteristic, including a notifying unit which generates a notifying sound about other devices existing in the vicinity, and a control unit which controls the notifying unit to generate a notifying sound constituting a chord with a notifying sound from the other device in a overlapping manner on the notifying sound from the other device.

Thus, if notifying sound from other device is output simultaneously, no confusion occurs, so that it is clearly recognized that both device are generating notifying sounds. Then, it is also clearly distinguished from the case where only one device is generating the notifying sound.

In addition, the present specification discloses a structure, as another technical characteristic, including an information communication unit which communicates information via a communication unit, a sensing unit which senses there is another device capable of supporting the function of the communication unit, a notifying unit which notifies a result of the sensing, and a control unit which decides, if there are plurality of other devices that are sensed, possible pairs with the plurality of other devices and the order of priority among the pairs.

Thus, if the plurality of pairs try to perform the information exchange in parallel, they can perform without confusion or interference.

In addition, a second technical characteristic disclosed in the present specification is related to a business card information exchange device. Concerning such a business card information exchange device, as described above, there are proposed various methods conventionally (e.g., see Patent Documents 1 to 3).

However, there are things to be studied remaining for wide use of the business card information input by the exchange.

Therefore, the present specification discloses a second technical characteristic so as to provide a business card information exchange device that can utilize business card information input electronically for a practical use.

Specifically, the present specification discloses, as the second technical characteristic, a business card information exchange device including an information communication unit (e.g., corresponding to the first mobile control unit 6, the storage unit 12, the second mobile control unit 106, and the storage unit 112 in FIG. 1) which communicates business card information via a communication unit (e.g., corresponding to the modulation/demodulation unit 28, the transmission/reception electrode 32, the modulation/demodulation unit 128, and the transmission and reception electrode 132 in FIG. 1), a storage unit for business card information (e.g., corresponding to the storage units 12 and 112 in FIG. 1), and a comparing unit which compares business card information received by the information communication unit with the business card information stored in the storage unit (e.g., corresponding to the first mobile control unit 6 and the second mobile control unit 106 in FIG. 1).

The business card exchange is performed usually in a first meeting, but there is a case where the same business card is received by the same person in different places or a case where a business card is received from the same person again after a personnel change. In addition, even if the same person has no personnel change, there is a case it is desirable to receive business card information from the person when the user meets the person again without a business card of the person. In this case, the business card information exchange device disclosed in the present specification, which has the above-mentioned structure, can compare the business card information received by the information communication unit with the business card information stored in the storage unit so as to support various cases.

In addition, the present specification discloses a structure, as a specific technical characteristic, including a control unit which controls the storage unit based on a result of the comparison to store the received business card information if the business card information stored in the storage unit does not include information of the same person of the business card information received by the information communication unit. Thus, information of the same person can be stored without overlap or confusion.

On the other hand, the present specification discloses a structure, as another specific technical characteristic, in which if the business card information stored in the storage unit includes information of the same person of the business card information received by the information communication unit, the comparing unit detects presence or absence of a change of content of the business card information. Thus, it is possible to distinguish the case where there is a change in the business card information of the same person and the case where there is no change of the same, so that the business card information can be stored without confusion.

In addition, the present specification discloses a structure, as a more specific technical characteristic, including a control unit which controls the storage unit to store a changed part of the received business card information, based on a result of the comparison of the comparing unit, if the business card information stored in the storage unit includes the information of the same person of the business card information received by the information communication unit, and if there is a change in content of the business card information. Thus, the changed part of the business card information can be stored without confusion.

In addition, the present specification discloses a structure, as a more specific technical characteristic, in which the control unit controls the storage unit to store the changed part of the business card information of the same person so that information after the change is added to information before the change for storing them. Thus, the history information of the same person can be updated and accumulated every time when the business card exchange is performed.

In addition, the present specification discloses a structure, as another specific technical characteristic, including a control unit which controls the storage unit to store reception date and time of the business card information received by the information reception unit so that a log of meeting with the same person is accumulated.

In addition, the present specification discloses a structure, as a more specific technical characteristic, in which even if the business card information stored in the storage unit includes information of the same person of the business card information received by the information communication unit and the comparing unit indicates that there is no change in the business card information, the control unit controls the storage unit to store the reception date and time of the business card information.

According to the technical characteristic as described above, it is possible to accumulate a log of meeting with the same person by communication of business card information, regardless of overlapping of a change in content of business card information.

In addition, the present specification discloses a business card information exchange device, as another technical characteristic, including an input unit which input business card information electronically, a storage unit for the business card information, and a display unit which is capable of displaying a layout of business card information of a plurality of persons input by the input unit in accordance with seat positions thereof.

Thus, similarly to arranging received paper business cards of the opponent conventionally on a desk in accordance with seat positions thereof after exchanging paper business cards, the input business card information can be layout on the display unit in accordance with the opponent seat positions.

In addition, the present specification discloses a structure, as a specific technical characteristic, including a sensing unit which senses seat positions of a plurality of persons, in which the display unit automatically displays a layout of the business card information of the plurality of persons in accordance with the seat positions based on the sensing result of the sensing unit.

In addition, the present specification discloses a structure, as another specific technical characteristic, including a correction operation unit for correcting the layout on the display unit manually, and a control unit for automatically storing an order of input of the business card information of the plurality of persons, in which the display unit displays the input business card information together with the input order. Thus, the display unit displays a list of the business card information in the exchange order, which can be a reference of memory for manually correcting the layout generated by the operation unit by viewing the seating state of the opponent.

In addition, the present specification discloses a structure, as another specific technical characteristic, in which even if the business card information stored in the storage unit includes information of the same person of the business card information input by the input unit and there is no change in the business card information, the display unit can display the layout the business card information of the plurality of persons input by the input unit in accordance with the seat position.

Thus, regardless of overlap or a change in content of the input business card information, the business card information can be displayed in layout for every attendant in accordance with the seat position.

In addition, the present specification discloses a business card information exchange device, as another technical characteristic, including a display unit which is capable of displaying a layout of exchanged business card information of a plurality of persons in accordance with seat positions thereof, a function operation unit for controlling the display unit to perform a display about functions other than the business card information display, an automatic off control unit which automatically turn off the display of the display unit if the function operation unit is not operated for a predetermined time, and a control unit which disables the function of the automatic off control unit if the display unit starts the layout display of the business card information.

Thus, even if the function operation unit is not operated for the predetermined time, the layout display of the business card information is continued, so as to avoid inconvenience that the layout display of the business card information is automatically turned off during the meeting.

In addition, various technical characteristics described above are specifically suitable for the case where the above-mentioned communication unit is constituted of the human body communication unit which applies information flowing via a human body to a human body and detects information flowing via the human body. In this case, for example, the business card information can easily be exchanged with each other by shaking hands or the like, and merits of various technical characteristics described above can be enjoyed without considering whether or not the business cards have been exchanged in the past or whether or not there is a change in the business card information.

In addition, various technical characteristics described above are specifically suitable for the case where the business card information exchange device is constituted as a mobile phone. It is because that the mobile phone is a device that can be carried in the business card exchange site with high probability.

In addition, a third technical characteristic disclosed in the present specification is related to an information exchange device, and more specifically to an information exchange device that is suitable for exchanging business card information. Concerning such an information exchange device, as described above, there are proposed various methods conventionally (e.g., see Patent Documents 1 to 3).

However, to make the information exchange be convenient may cause accidental leak of information on the other side, so there are many issues to be considered.

Therefore, the present specification discloses a third technical characteristic so as to provide an information exchange device in which information exchange is easy and security is also considered.

Specifically, the present specification discloses an information exchange device for business card information, as the third technical characteristic, including an information communication unit (e.g., corresponding to the first mobile control unit 6, the storage unit 12, the second mobile control unit 106, and the storage unit 112 in FIG. 1) which communicates business card information via a communication unit (e.g., corresponding to a modulation/demodulation unit 28, a transmission/reception electrode 32, a modulation/demodulation unit 128, and a transmission/reception electrode 132 in FIG. 1), a storage unit which stores the user's business card information to be transmitted and received business card information of other persons (e.g., corresponding to the storage unit 12 and the storage unit 112 in FIG. 1), and a decision unit which decides whether or not the communication unit can perform communication (e.g., corresponding to the first mobile control unit 6, the modulation/demodulation units 28 and 32, the modulation/demodulation unit 128, the transmission/reception electrode 132, and the second mobile control unit 106 in FIG. 1), determining unit which determines enable or disable of communication by the communication unit (e.g., corresponding to the first mobile control unit 6 or the second mobile control unit 106 in FIG. 1), a control unit which inhibits the information transmission from the storage unit even if the decision unit decides that communication is possible unless the determining unit determines the communication is enabled (e.g., corresponding to the first mobile control unit 6 and the second mobile control unit 106 in FIG. 1).

Thus, it is possible to constitute so that the information exchange can be performed easily based on decision of the decision unit while it is possible to prevent information leak unless the determining unit enables the communication.

Note that the above-mentioned technical characteristic is suitable for the case, as a specific structure of the communication unit, in which the human body communication unit which applies information flowing via a human body to a human body and detects information flowing via the human body is adopted, so that the business card information exchange is performed automatically by shaking hands, for example. It is because that the business card information does not leak when an unknown person touches the user unless the determining unit enables the communication.

In addition, the above-mentioned technical characteristic is specifically suitable for constituting as a mobile phone. It is usual to have a mobile phone when shaking hands. Therefore, electronic exchange of business card information can be performed easily, and accidental leak of business card information can be prevented.

In addition, the present specification discloses a structure, as a specific technical characteristic, including a display unit which displays the business card information communicated by the information communication unit, in which the determining unit disables communication by the communication unit if the display unit does not function. Thus, it is possible to prevent accidental leak of the business card information when the communicated business card information is not displayed.

In addition, the present specification discloses a structure, as another specific technical characteristic, including a manual setting unit, in which the determining unit disables communication by the communication unit unless there is a setting by the manual setting unit. Thus, it is possible to prevent accidental leak of the business card information unless an intentional manual setting is performed.

In addition, the present specification discloses a structure, as another specific technical characteristic, including an enrollment unit which enrolls the opponent for communicating business card information and a sensing unit which senses the opponent (e.g., corresponding to the first control unit 6 or the second control unit 106 in FIG. 1), in which the determining unit disables communication by the communication unit if the sensed opponent does not match the enrolled opponent. Thus, it is possible to prevent accidental leak of the business card information to an unspecified opponent.

In addition, the present specification discloses a structure, as a specific technical characteristic, including an enrollment management unit which manages maintaining or delete enrollment of the opponent in the enrollment unit (e.g., corresponding to the first control unit 6 or the second control unit 106 in FIG. 1) so that maintenance of the enrollment is performed.

In addition, the present specification discloses a structure, as another more specific technical characteristic, in which the control unit permits the information transmission if the sensed opponent matches the enrolled specific opponent and only if the decision unit decides the communication is enabled, even if the determining unit does not determine that the communication is enabled. Thus, information transmission to a specific opponent with no risk is promoted.

In addition, the present specification discloses a structure, as another specific technical characteristic, including a cancel control unit which cancel the determination to enable communication by the determining unit when a cancel condition is satisfied (e.g., corresponding to the first control unit 6 or the second control unit 106 in FIG. 1). Thus, it is possible to prevent accidental leak of business card information by leaving the determination by the determining unit.

In addition, the present specification discloses an information exchange device, as another technical characteristic, including an information communication unit which performs information communication via a communication unit, a storage unit which stores information to be transmitted, a decision unit which decides whether or not communication by the communication unit is enabled, an enrollment unit which enrolls an opponent for information communication (e.g., corresponding to the storage unit 12 or the storage unit 112 in FIG. 1), a sensing unit which senses the opponent, a control unit which disables information transmission unless the sensed opponent matches the enrolled opponent even if the decision unit decides that the communication is enabled, an enrollment management unit which automatically manages to maintain or delete enrollment of the opponent in the enrollment unit.

Thus, it is possible to prevent leak of information to an unspecified opponent, and maintenance of enrollment of the specific opponents is performed so as to realize the same. This characteristic is useful without limiting to communication of business card information.

In addition, the present specification discloses a structure, as a specific technical characteristic, in which the enrollment management unit automatically deletes enrollment of an opponent after a predetermined time has passed after the enrollment. Thus, risk of leak of information based on old information can be reduced.

In addition, the present specification discloses a structure, as another specific technical characteristic, including a manual setting unit, in which the control unit disables information transmission unless setting with the manual setting unit is performed even if the sensed opponent matches the enrolled opponent. Thus, risk of accidental leakage of information can be reduced.

In addition, the present specification discloses a structure, as a more specific technical characteristic, in which the enrollment management unit automatically deletes enrollment of an opponent when a predetermined time has passed after the setting by the manual setting unit. Thus, it is possible to reduce a risk of information leak due to omission of cancelling the manual setting.

In addition, the present specification discloses a structure, as another more specific technical characteristic, including an automatic cancelling unit which automatically cancels setting by the manual setting unit when a predetermined time has passed after setting by the manual setting unit. Thus, it is possible to reduce a risk of information leak due to omission of cancelling the manual setting.

In addition, the present specification discloses a structure, as another specific technical characteristic, in which the enrollment management unit automatically manages enrollments based on whether or not information exchange has been performed with the opponent by the information communication unit. Thus, it is possible to reduce a risk of information leak due to leaving of an enrollment of an opponent having no record.

In addition, the present specification discloses a structure, as a more specific technical characteristic, in which the enrollment management unit automatically manages to maintain or delete an enrollment in accordance with information exchange date and time in the past. Thus, it is possible to reduce a risk of information leak due to an old record.

In addition, the present specification discloses a structure, as another more specific technical characteristic, in which the enrollment management unit automatically manages to maintain or delete an enrollment in accordance with frequency of information exchange. Thus, it is possible to reduce a risk of information leak and to facilitate information exchange with an opponent of high frequency of contact.

In addition, the present specification discloses an information exchange device, as another technical characteristic, including an information communication unit which performs information communication via a communication unit, a storage unit which stores information to be transmitted via the communication unit, an enrollment unit which enrolls an opponent for information communication, a sensing unit which senses the opponent, a manual setting unit which performs setting of permitting information transmission, and a control unit which determines enable or disable of the information transmission in accordance with setting by the manual setting unit and comparison between the sense by the sensing unit and the enrollment by the enrollment unit.

Thus, it is possible to determine enable or disable of the information transmission in accordance with the opponent sensed by the sensing unit. For instance, if the opponent sensed by the sensing unit matches the specific opponent enrolled in the enrollment unit, it is possible to enable the information transmission without setting by the setting unit, and it is possible to disable the information transmission for the opponent that does not match unless setting by the setting unit is performed. In this way, it is possible to reduce risk of information leak to an unintended opponent while the information transmission to a specific opponent can easily be performed.

In addition, a fourth technical characteristic disclosed in the present specification is related to an information exchange device, an information reproduction device, and an information exchange system including them. As to such an information exchange device, as described above, there are proposed various methods conventionally (e.g., see Patent Documents 1 to 3).

However, to facilitate information exchange may cause accidental leak of information, and mixed entering of information from an unexpected opponent is also possible. Therefore, there are many issues to be considered.

Therefore, the present specification discloses a fourth technical characteristic so as to provide an information exchange device, an information reproduction device, and an information exchange system including them, in which information exchange is easy, and prevention of various confusions in the exchange is considered.

Specifically, the present specification discloses an information exchange device, as the fourth technical characteristic, including a modulation unit which modulates contents held by a content holding unit (e.g., corresponding to the storage unit 12 or the storage unit 112 in FIG. 1) into a narrow-band transmission signal, a control unit which adjusts a band of a transmission signal that is modulated by the modulation unit in relationship with a specific opponent enrolled in the enrollment unit (e.g., corresponding to the storage unit 12 or the storage unit 112 in FIG. 1), and a storage unit which stores a band of the transmission signal adjusted by the control unit (e.g., corresponding to the storage unit 12 or the storage unit 112 in FIG. 1).

Thus, when content such as music is shared, the content is modulated into a transmission signal in a band that is stored in advance in relationship with a specific opponent. Therefore, when the user's content is transmitted to the opponent for sharing the same, it is not necessary to perform the adjustment of the band in relationship with the opponent every time. Note that this is performed also on the opponent side if the information exchange device of the specific opponent enrolled in the enrollment unit has the same structure. Therefore, between the case where the user's content is transmitted and the case where the opponent content is received, no cross talk occurs even if mutual adjustment is not performed. In addition, the communication is performed in narrow-band stored in the storage unit. Therefore, no cross talk occurs in an unexpected transmission of a third party unless the band matches.

In addition, the present specification discloses a structure, as a detail technical characteristic, in which the modulation unit performs the modulation so as to output the transmission signal to be applied to a human body and to flow in the human body. Thus, communication of a transmission signal with a specific opponent such as a lover can be performed by the human body communication. For instance, by grasping hands with each other or by being close to each other, contents can be shared between them, so that listening to the same music, for example. In this case too, only by operation of selecting content, opponent's content can be shared without adjusting a communication band or the like. The same is true for the opponent. Therefore, if they are in a communicating state by the human body communication, it is possible to handle opponent's contents like his or her own contents with each other.

In addition, the present specification discloses a structure, as another detail technical characteristic, in which the information exchange device is constituted as a mobile phone. Thus, contents can be shared by the information exchange devices that are daily carried by each other.

In addition, the present specification discloses a structure, as another detail technical characteristic, in which the information exchange device includes a transfer unit which transfers a band of the transmission signal adjusted by the control unit to a specific opponent enrolled in the enrollment unit. Thus, when the band of the transmission signal is determined prior to the opponent, this is transferred to the opponent so as to perform the adjustment of the band.

In addition, the present specification discloses a structure, as another more detail technical characteristic, in which the control unit adjusts a band of the transmission signal avoiding a band for transmission from a specific opponent enrolled in the enrollment unit. Thus, when the opponent determines a band of the transmission signal in priority, it is possible to adjust the band so as not to overlap the determined band.

In addition, the present specification discloses a structure, as another more detail technical characteristic, in which the information exchange device includes a transfer unit (e.g., corresponding to the first mobile short range communication unit 20 and the transmission/reception electrode 32 in FIG. 9) which transfers the band of the transmission signal adjusted by the control unit to an information reproduction device for reproducing contents (e.g., corresponding to the headphone block 202 in FIG. 9). Thus, it is possible to support the case, for example, where the information reproduction device such as a headphone or an earphone is constituted separately from the information exchange device with a wireless system.

Note that the above-mentioned information reproduction device may be attached to the same person who carries the information exchange device or to a specific opponent. Note that if the transmission signal is transmitted by the human body communication, in the case of the same person, for example, the band is transmitted from the information exchange device in a pocket through a skin and the like of the human body to the information reproduction device mounted on the head. In addition, in the case of the information reproduction device attached to the opponent, the band is transmitted through the tied hands and the like.

In addition, the present specification discloses a structure, as a detail technical characteristic, in which the transfer unit transfers the band of the transmission signal adjusted by the control unit repeatedly to the information reproduction device. Thus, the information reproduction device can reproduce contents also from some midpoint of transmission of the contents from the information exchange device. For instance, when the transmission signal is transmitted by the human body communication, the content can be shared from grasping hands with each other or being close to each other even if the reproduction has started and is at some midpoint.

In addition, the present specification describes a structure, as another detail technical characteristic, in which the information exchange device includes a setting unit which sets a band different from the band adjusted by the control unit, and a reset execution unit which reset from the band set by the setting unit to the band stored in the storage unit. Thus, it is possible to change the communication band in accordance with various situations. Even this change is performed, the communication band is reset to the band after adjustment with a specific opponent stored in the storage unit, so it is not necessary to adjust the communication band again with the specific opponent. It is possible to perform this reset automatically after a predetermined time has passed after the change, for example.

In addition, the present specification discloses a structure, as another detail technical characteristic, in which the control unit adjusts bands of transmission signals in a relationship among three or more persons including an enrolled opponent. Thus, when content is shared in a group including a specific opponent, it is possible to prevent a cross talk. Note that the reset execution unit is useful also in the case where the set band is changed as the adjustment of bands of transmission signals in the relationship among three or more persons, so as to reset that communication band to the band adjusted with the specific opponent.

In addition, the present specification discloses an information exchange system, as another technical characteristic, including an information exchange device and an information reproduction device. In the above-mentioned system, the information exchange device includes a modulation unit which modulates the content held in the content holding unit to a transmission signal in a predetermined band, a control unit which adjusts a band of the transmission signal modulated by the modulation unit, and a transfer unit which transfers the band adjusted by the control unit externally. On the other hand, the information reproduction device includes a storage unit which stores the band transmitted by the transfer unit of the information exchange device, a demodulation unit which demodulates the transmission signal of the band stored in the storage unit into the content, and a reproducing unit which reproduces the content demodulated by the demodulation unit. Thus, the content is communicated between the information exchange device and the information reproduction device for reproduction without confusion.

Note that the present specification discloses a structure, as a specific technical characteristic, in which the modulation unit in the above-mentioned system performs the modulation so as to output the transmission signal that is applied to the human body and flows in the human body, and the demodulation unit demodulates the transmission signal flowing in the human body.

In addition, the present specification discloses an information exchange device, as another technical characteristic, including an enrollment unit which enrolls a specific opponent, a modulation unit which modulates content held in the content holding unit into a transmission signal to be applied to the human body so as to flow in the human body, a detection unit which detects a contact state with other human body, and a transmission control unit which starts transmission of the content based on detection by the detection unit. Thus, the content can be shared without an operation by being close to each other, for example. In addition, if the content is e-mail, the e-mail can be transmitted via the human body communication only by grasping the opponent's hand after creating the e-mail without other operation.

In addition, the present specification discloses a structure, as a detail technical characteristic, in which the transmission control unit does not start transmission of the content if a contact state is not detected for a predetermined time, even if a contact state is detected next. Thus, for example, after finishing exchange of e-mail, it is possible to prevent accidental e-mail transmission by a contact with an unexpected person.

In addition, the present specification discloses a structure, as another detail technical characteristic, in which the information exchange device is constituted as a mobile phone. Thus, contents can be shared via the human body communication by using the information exchange devices that are daily carried by each other.

INDUSTRIAL APPLICABILITY

The present invention provides a technique that can be used for information exchange devices.

The invention claimed is:

1. An information exchange device comprising:
    a human body communication unit which applies information flowing via a first human body to a second human body and detects information flowing via the first human body;
    an information transmission unit which transmits information via the human body communication unit;
    an identification unit which identifies another device which can transmit information from the information transmission unit;
    a detection unit which detects a contact state with the first and second human bodies; and
    a transmission control unit which starts transmission of information according to identification by the identification unit and a detection by the detection unit,
    wherein the identification unit includes an enrollment unit which enrolls another device for information transmission by the information transmission unit, and a sensing unit which senses another device, and identifies that the other device sensed by the sensing unit is capable of information exchange by the transmission unit if the other device matches the enrollment of the enrollment unit, and
    wherein the transmission control unit does not start the information transmission to the other device even if the other device is enrolled in the enrollment unit, if a term during which the sensing unit has not sensed the enrolled device continues over a predetermined time and even if a next contact state with another human body is detected with respect to the enrolled device.

2. An information exchange device according to claim 1, wherein the information exchange device comprises a mobile phone.

3. An information exchange device according to claim 1, wherein the information transmitted by the information transmission unit is e-mail information, and the human body communication unit detects the information flowing via human bodies with hands in contact with one another.

4. An information exchange device according to claim 1, wherein the information transmitted by the information transmission unit is contents information, and the human body communication unit detects the information flowing via human bodies with hands in contact with one another.

5. An information exchange device according to claim 1, wherein the information transmitted by the information transmission unit is business card information, and the human body communication unit detects the information flowing via human bodies with hands in contact with one another.

6. An information exchange device according to claim 5, further comprising an information reception unit which receives business card information via the human body communication unit, a storage unit for the business card information, and a comparing unit which compares the business card information received by the information reception unit with the business card information stored in the storage unit.

7. An information exchange device comprising:
    a human body communication unit which applies information flowing via a first human body to a second human body and detects information flowing via the first human body;
    an information transmission unit which transmits information via the human body communication unit;
    an identification unit which identifies another device which can transmit information from the information transmission unit;
    a detection unit which detects a contact state with the first and second human bodies; and
    a transmission control unit which starts transmission of information according to identification by the identification unit and a detection by the detection unit, and
    wherein the identification unit includes an enrollment unit which enrolls another device for information transmission by the information transmission unit, and a sensing unit which senses another device, and identifies that the other device sensed by the sensing unit is capable of information exchange by the transmission unit if the other device matches the enrollment of the enrollment unit,
    wherein the information transmission unit includes a modulation unit which modulates the information to a narrow-band transmission signal, an adjustment unit which adjusts a band of the transmission signal modulated by the modulation unit in relationship with an opponent enrolled in the enrollment unit, and a storage unit which stores the band of the transmission signal adjusted by the adjustment unit.

8. An information exchange device comprising:
    a display unit which can display received business card information;
    a function operation unit for controlling the display unit to perform a display concerning a function other than the business card information display;
    an automatic off control unit which automatically turns off a display on the display unit if the function operation unit is not operated for a predetermined time; and
    a display control unit which disables a function of the automatic off control unit if the display unit starts the layout display of seating arrangement in a meeting room of the persons from which the business card information is received, so that the layout display of seating arrangement is continued even if an operation of the function operation unit is not performed for a predetermined time.

9. An information exchange device according to claim 8, further comprising a storage unit which automatically stores a reception order of business card information of a plurality of persons at the same meeting based on the information reception unit.

* * * * *